(12) United States Patent
van de Poll

(10) Patent No.: US 11,368,823 B2
(45) Date of Patent: Jun. 21, 2022

(54) MULTIFUNCTIONAL INTERACTIVE BEACON WITH MOBILE DEVICE INTERACTION

(71) Applicant: CityBeacon IP BV, Rotterdam (NL)

(72) Inventor: Arthur van de Poll, Rotterdam (NL)

( * ) Notice: Subject to any disclaimer, the term of this patent is extended or adjusted under 35 U.S.C. 154(b) by 0 days.

(21) Appl. No.: 16/926,877

(22) Filed: Jul. 13, 2020

(65) Prior Publication Data

US 2020/0351628 A1 Nov. 5, 2020

Related U.S. Application Data

(63) Continuation of application No. 15/884,818, filed on Jan. 31, 2018, now Pat. No. 10,715,972, which is a
(Continued)

(51) Int. Cl.
| | |
|---|---|
| *H04W 4/30* | (2018.01) |
| *H04W 4/024* | (2018.01) |
| *H04W 4/029* | (2018.01) |
| *H04W 4/02* | (2018.01) |
| *G06V 10/94* | (2022.01) |
| *G06V 20/52* | (2022.01) |
| *G06V 40/16* | (2022.01) |
| *G09B 29/00* | (2006.01) |

(Continued)

(52) U.S. Cl.
CPC .............. *H04W 4/30* (2018.02); *G06V 10/95* (2022.01); *G06V 20/53* (2022.01); *G06V 40/172* (2022.01); *G06V 40/174* (2022.01); *H04W 4/02* (2013.01); *H04W 4/024* (2018.02); *H04W 4/029* (2018.02); *G06F 3/013* (2013.01); *G06F 3/017* (2013.01); *G06Q 30/02* (2013.01); *G09B 29/008* (2013.01); *H04W 4/23* (2018.02); *H04W 4/80* (2018.02); *H04W 84/04* (2013.01)

(58) Field of Classification Search
None
See application file for complete search history.

(56) References Cited

U.S. PATENT DOCUMENTS 5,852,243 A * 12/1998 Chang .................... G01N 29/14
73/659
6,036,209 A * 3/2000 Tsumura ............ B60K 31/0008
280/169

(Continued)

*Primary Examiner* — Fekadeselassie Girma
(74) *Attorney, Agent, or Firm* — Alphapatent Associates, Ltd; Daniel J. Swirsky

(57) ABSTRACT

A system and method for adapting the behavior of an interactive presence based application on a mobile computing device associated with a user; comprising: providing a plurality of multifunctional beacons; wherein the plurality of beacons provide a mesh wireless network; wherein each of the plurality of beacons provides a local wireless connection; providing an OMS backend for management of the plurality of beacons; wherein the OMS backend runs on a server; connecting by the mobile device to one or both of the mesh network and a local network; wherein the plurality of beacons report the connecting to the OMS backend; determining by the OMS backend the proximity of the mobile device to one or more of the plurality of beacons based on the reported connections; and adapting the behavior of the application and/or the beacons based on the determined proximity.

20 Claims, 27 Drawing Sheets

Related U.S. Application Data continuation-in-part of application No. PCT/IB2016/054579, filed on Jul. 29, 2016.

(60) Provisional application No. 62/452,946, filed on Jan. 31, 2017, provisional application No. 62/312,409, filed on Mar. 23, 2016, provisional application No. 62/199,335, filed on Jul. 31, 2015.

(51) Int. Cl.

| | |
|---|---|
| H04W 4/80 | (2018.01) |
| G06F 3/01 | (2006.01) |
| H04W 84/04 | (2009.01) |
| H04W 4/23 | (2018.01) |
| G06Q 30/02 | (2012.01) |

(56) References Cited

U.S. PATENT DOCUMENTS

| | | | | |
|---|---|---|---|---|
| 6,055,536 | A * | 4/2000 | Shimakawa | G10L 15/26 707/999.102 |
| 6,079,862 | A * | 6/2000 | Kawashima | G01S 3/7864 700/59 |
| 6,411,806 | B1 * | 6/2002 | Garner | H04W 12/062 455/430 |
| 6,768,719 | B1 * | 7/2004 | Couaillet | H04W 24/00 370/242 |
| 7,890,136 | B1 * | 2/2011 | Fujisaki | H04M 1/72415 455/12.1 |
| 9,053,124 | B1 * | 6/2015 | Dornquast | H04L 47/821 |
| 9,907,147 | B2 * | 2/2018 | Chen | F21V 14/06 |
| 10,319,157 | B2 * | 6/2019 | Minster | G07C 5/006 |
| 10,362,461 | B2 * | 7/2019 | Stitt | H04W 4/38 |
| 10,499,477 | B2 * | 12/2019 | Chen | H05B 47/12 |
| 10,506,691 | B2 * | 12/2019 | Klecha | H04W 4/33 |
| 10,609,784 | B1 * | 3/2020 | Refsdal | H05B 47/11 |
| 10,682,948 | B2 * | 6/2020 | Drexler | B60Q 1/26 |
| 2004/0057402 | A1 * | 3/2004 | Ramos | H04W 28/18 370/329 |
| 2005/0159167 | A1 * | 7/2005 | Hakalin | H04L 47/14 455/436 |
| 2005/0255894 | A1 * | 11/2005 | Heller | G06F 9/442 455/574 |
| 2005/0267965 | A1 * | 12/2005 | Heller | H04L 41/00 709/224 |
| 2008/0281722 | A1 * | 11/2008 | Balasubramanian | G06Q 30/0641 705/26.8 |
| 2009/0171510 | A1 * | 7/2009 | Hu | H05B 47/155 700/298 |
| 2009/0227251 | A1 * | 9/2009 | Lei | H04W 24/08 455/425 |
| 2009/0326991 | A1 * | 12/2009 | Wei | G06Q 10/08355 705/5 |
| 2010/0277344 | A1 * | 11/2010 | Jacobs | E01F 9/619 362/183 |
| 2011/0099040 | A1 * | 4/2011 | Felt | G01C 21/3438 715/764 |
| 2011/0200199 | A1 * | 8/2011 | Wakao | G01H 17/00 381/56 |
| 2012/0015783 | A1 * | 1/2012 | Brown | A63B 21/4009 482/74 |
| 2012/0044350 | A1 * | 2/2012 | Verfuerth | H05B 47/125 348/143 |
| 2012/0062123 | A1 * | 3/2012 | Jarrell | H05B 47/19 315/131 |
| 2012/0105202 | A1 * | 5/2012 | Gits | G01C 21/206 340/8.1 |
| 2012/0143662 | A1 * | 6/2012 | Heath | G06Q 30/0219 705/14.5 |
| 2012/0310703 | A1 * | 12/2012 | Cavalcanti | G06Q 30/0201 705/7.29 |
| 2013/0015783 | A1 * | 1/2013 | Herbst | H05B 47/175 315/297 |
| 2013/0081119 | A1 * | 3/2013 | Sampas | G06Q 20/40145 726/7 |
| 2013/0124186 | A1 * | 5/2013 | Donabedian | G06F 40/134 715/265 |
| 2013/0169668 | A1 * | 7/2013 | Lynch | G01S 7/4808 345/619 |
| 2014/0043173 | A1 * | 2/2014 | Chen | G08G 1/202 340/993 |
| 2014/0067130 | A1 * | 3/2014 | Pillai | H05B 47/10 315/297 |
| 2014/0266805 | A1 * | 9/2014 | Tippelhofer | G08G 1/148 340/932.2 |
| 2015/0052452 | A1 * | 2/2015 | Alekhin | H04L 65/403 715/753 |
| 2015/0262195 | A1 * | 9/2015 | Bergdale | G06Q 20/3274 705/5 |
| 2015/0264776 | A1 * | 9/2015 | Amarin | G06Q 10/0875 315/129 |
| 2015/0289005 | A1 * | 10/2015 | Holmquist | H04N 21/25833 725/25 |
| 2015/0332338 | A1 * | 11/2015 | Chelko | G06F 21/6245 705/14.66 |
| 2015/0334548 | A1 * | 11/2015 | Liu | H04W 4/80 370/329 |
| 2016/0063477 | A1 * | 3/2016 | Egan | G06Q 20/202 455/406 |
| 2016/0323276 | A1 * | 11/2016 | Flett | G06Q 20/1085 |
| 2019/0081739 | A1 * | 3/2019 | Nammi | H04L 41/08 |
| 2019/0096177 | A1 * | 3/2019 | Sepich | G07F 17/3244 |

* cited by examiner

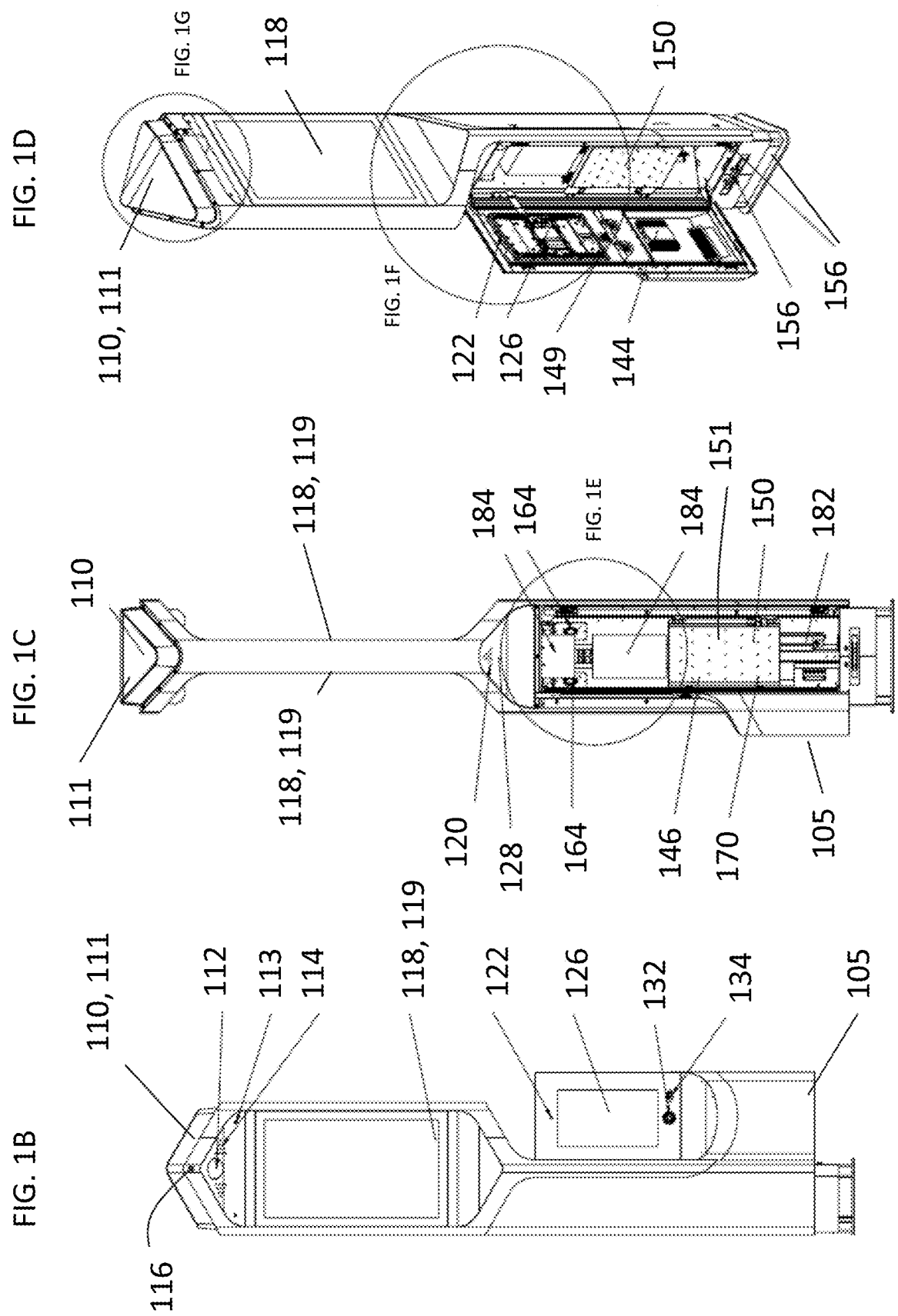

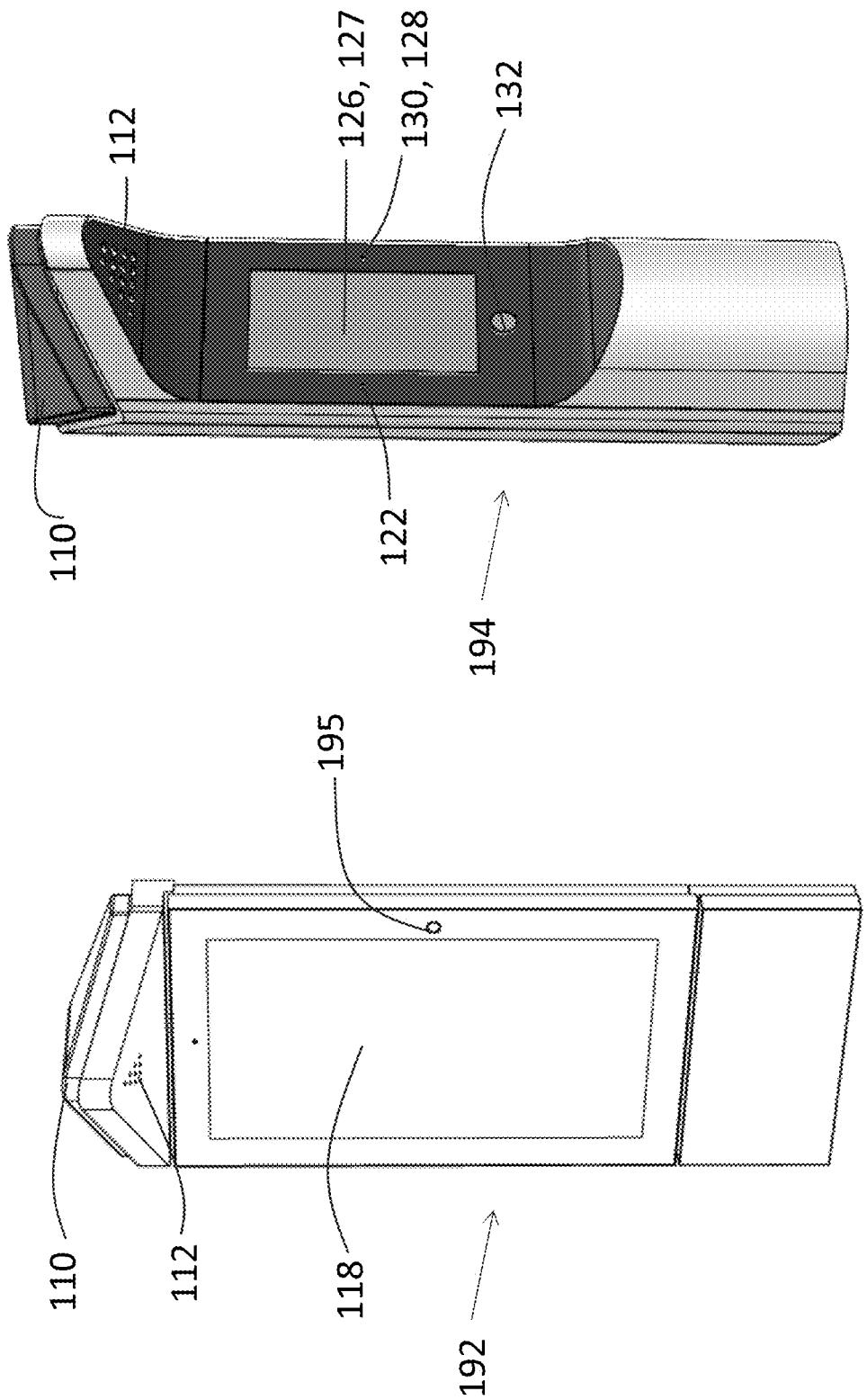

MULTIFUNCTIONAL INTERACTIVE BEACON WITH MOBILE DEVICE INTERACTION

FIELD OF THE INVENTION

The present invention is of a system for an intelligent interactive multifunctional beacon and more specifically a beacon providing information and communication as well as gathering data from and/or intelligently responding to gathered data about its surroundings and interactions with the beacon or one of its sensors as well as with connected mobile devices.

BACKGROUND OF THE INVENTION

City councils and property management companies are faced with an increasing need to provide and manage multiple services to residents, visitors, and users of the areas under their control. Such services include:
  Communication such as Internet and phone connectivity
  Security such as surveillance systems and alarms
  Emergency services
  Gathering of environmental data
  Mobile payment and purchase
  Information such as maps, timetables, guides, and also advertising
  Traffic and crowd management
  Lighting Today, most of these functions and services are provided as separate systems each with their own management, communication, and deployment methods. For example, surveillance cameras and sensors for gathering environmental data will be placed on different support structures and each will have a separate communication path back to a separate data gathering and management system. An emergency situation detected by these cameras will require the manual activation of an entirely separate announcement system.

The lack of integration of such services also leads to lost opportunities for revenue such as tailoring advertising on digital billboards based on the audience surrounding those boards. Additionally displays used for advertising cannot be repurposed for user interaction, announcements, or crowd management. A further disadvantage is the greater power requirements of multiple separate systems. An integrated system could also enable opportunities for vendors to offer services that include advertising as well as purchase and delivery. Finally, while some information services are available in kiosks of limited functionality, there is no ability to transfer data or generally interact with mobile devices thus limiting the services provided to a specific place.

Further, communication services do not provide data about user location that could be used for interactive applications. While interactive location based applications on user mobile devices have been proposed for many years, these are generally based on GPS and related technologies which often suffer from coverage gaps and inaccuracy—especially indoors. This in turn gives rise to user apprehension in using such applications (which also tend to drain the device battery). There is generally no provision for a position sensing technology that is visibly present near the physical area of interest. Having a physical presence would have the advantage that users could see and interact with the sensing device, which in turn could provide more accurate confirmation of user location. While users may not be aware of the technology, it would be easier for them to accept real-time changes to proximity sensitive interactive applications on their mobile devices.

Another aspect of urban services is lighting. Different types of lighting may be found in urban areas including street lighting, functional lighting or emergency lighting. Today there is no mechanism to control all the available forms of lighting as a coherent system providing more than the sum of its parts. For example, it would be useful to be able to adopt uniform lighting colors (where supported by the infrastructure) for purposes of messaging or advertising, or reduce the intensity of lighting, when full intensity is not required, to save power.

It would therefore be advantageous to combine the many functions and services required by city councils and property management companies with capabilities of user interaction into one homogenous system. It would be further desirable to provide embodiment of these services in a visible platform deployable throughout the managed area.

SUMMARY OF THE INVENTION

The present invention overcomes the deficiencies of the background art by providing a system for an interactive multifunctional beacon and more specifically a beacon providing information and communication as well as gathering data from and/or intelligently responding to gathered data about its surroundings and interactions with the beacon or one of its sensors as well as with connected mobile devices. The invention further provides for management and operation of the beacon network.

According to some embodiments of the present invention, a method for adapting the behavior of an interactive presence based application on a mobile computing device associated with a user comprises: providing a plurality of multifunctional beacons; wherein the plurality of beacons provide a mesh wireless network; wherein each of the plurality of beacons provides a local wireless connection; providing an OMS backend for management of the plurality of beacons; wherein the OMS backend runs on a server; connecting by the mobile device to one or both of the mesh network and a local network; wherein the plurality of beacons report the connecting to the OMS backend; determining by the OMS backend the proximity of the mobile device to one or more of the plurality of beacons based on the reported connections; adapting the behavior of the application and/or the beacons based on the determined proximity; registering of a user associated with the device at one of the plurality of beacons; wherein the registering comprises: facial interpretation of the user by the one of the plurality of beacons; and reporting of the registration to the OMS backend; wherein the OMS backend comprises a database of users; and detecting the proximity of a user to one of the plurality of beacons by facial interpretation of the user by the one of the plurality of beacons based on comparison of the detected user with the database.

Preferably, the adapting comprises providing an interactive second application on each of the beacons and adapting by the second application of its behavior based on the determined proximity. Preferably, the method further comprises reporting the determined proximity by the server to the application and the second application. Preferably, the registering further comprises voice recognition of the user. Preferably, voice and/or facial interpretation are converted into a user identifier. Preferably the user identifier is used for authentication of the user. Preferably the registering further comprises collecting user data. Preferably the user data is incorporated into the identifier.

Preferably, the local wireless connection is based on one of the group consisting of: iBeacon, Bluetooth, and NFC. Preferably the mesh wireless network is based on WiFi. Preferably, the application is a tour guide application and the adapting of the application comprises at least one of altering the tour route, providing rewards to the user, or providing information about proximal locations.

Preferably, more than one user device is connected to any of the plurality of beacons and the backend determines the locations of all of the connected devices. Preferably, the backend determines the crowd density based on the determined locations. Preferably, the beacons capture video of their surroundings and transmit the video to the backend, and wherein the backend determines a second crowd density based on analysis of the video. Preferably, the backend determines that the crowd density and/or second crowd density exceed the capacity of an analyzed area. Optionally, the application is an event guide application and the adapting of the application comprises at least one of directing the user to different events to reduce crowd density or second crowd density.

Preferably, the proximity of the user is determined based on a method selected from the group consisting of: the local wireless connection radio signal strength of the user device; facial interpretation of the user; the mesh wireless network radio signal strength of the user device; and user interaction with the beacon.

Preferably, the beacon comprises: a beacon enclosure; a computing device mounted within the enclosure; a status light mounted on top of the enclosure; a dome camera mounted proximal to the top of the enclosure; an upper display mounted proximal to the dome camera; a WiFi antenna and transceiver mounted within the enclosure; an environmental sensor mounted within the enclosure; a lower display mounted below the upper display; a touch interface mounted in front of the lower display; a programmable push button mounted below the lower display; an interactive ecommerce panel mounted adjacent to the push button; a light mounted proximal to the dome camera; a light mounted proximal to the lower display; and a camera mounted proximal to the lower display; wherein the beacon is operated by a frontend OMS running on the computing device.

According to another embodiment of the present invention, a method for selection of content displayed on a plurality of multifunctional beacons comprises: providing a plurality of multifunctional beacons; wherein each of the beacons comprises a camera, a display and a computing device; providing an OMS backend running on a server; providing an OMS frontend running on the computing device in each of the plurality of beacons wherein the frontend is in communication with the backend, the display and the camera; capturing by the camera of images of people in the vicinity of each of the beacons; transmitting the images by the frontend to the backend for image analysis; based on the analysis, determining by the backend optimal content for display on the display of the plurality of beacons; transmitting by the backend of the optimal content to each of the plurality of beacons; and displaying of the optimal content by the frontend on the displays of each of the plurality of beacons.

According to another embodiment of the present invention, a method for detecting and responding to an emergency comprises providing a multifunctional beacon; wherein the beacon comprises a camera, a display, an emergency pushbutton, a status light and a computing device; providing an OMS backend running on a server; providing an OMS frontend running on the computing device in the beacon wherein the frontend is in communication with the backend, the display, the pushbutton, the light and the camera; pushing of the pushbutton by an individual in case of an emergency; as a result of the pushing, capturing by the camera of video of the surroundings of the beacon and changing the color of the status light; transmitting an emergency notification and the video by the frontend to the backend; and upon receiving the notification, notifying of emergency services by the backend including geographic location of the beacon, and storing the video on the server.

According to another embodiment of the present invention, a method for gathering environmental data in a geographic area comprises: providing a plurality of multifunctional beacons; wherein each of the beacons comprises an environmental sensor and a computing device; providing an OMS backend running on a server; providing an OMS frontend running on the computing device in each of the plurality of beacons wherein the frontend is in communication with the backend and the sensor; providing a portal for selecting apps for deployment on the plurality of beacons; selecting an environmental monitoring app for deployment on the beacons; deploying the monitoring app on the beacons wherein the app runs on the computing device as part of the frontend; instructing of the sensor by the app to capture environmental data in the vicinity of each of the beacons; and transmitting the data by the frontend to the backend for analysis.

According to another embodiment of the present invention, a method for crowd control at a multi-location event comprises; providing a plurality of multifunctional beacons; wherein each of the beacons comprises a camera, a communications transceiver and a computing device; wherein a beacon is deployed at each location of the multi-location event; providing an app running the mobile devices of event attendees; wherein the app provides recommendations for events at each location; wherein each mobile device is connected to one of the transceivers; providing an OMS backend running on a server; providing an OMS frontend running on the computing device in each of the plurality of beacons wherein the frontend is in communication with the backend, the transceiver and the camera; capturing by the camera of images of people in the vicinity of each of the beacons and transmitting the images by the frontend to the backend for image analysis to determine crowd numbers; establishing the location of mobile devices relative to the beacons based on signal strength received at the transceiver and transmitting the locations of the devices by the frontend to the backend; and based on crowd numbers directing by the backend of the apps to recommend events such that users of the mobile devices are more evenly distributed between event locations.

According to another embodiment of the present invention, a multifunctional beacon comprises: a beacon enclosure; a computing device mounted within the enclosure; a status light mounted on top of the enclosure; a dome camera mounted proximal to the top of the enclosure; an upper display mounted proximal to the dome camera; a WiFi antenna and transceiver mounted within the enclosure; an environmental sensor mounted within the enclosure; a lower display mounted below the upper display; a touch interface mounted above the lower display; a programmable push button mounted below the lower display; a short range transceiver mounted within the enclosure; wherein the transceiver is based on Bluetooth or iBeacon; a light mounted proximal to the dome camera; a light mounted proximal to the lower display; a camera mounted proximal to the lower display; an interactive ecommerce panel mounted adjacent to the push button, wherein the beacon is operated by an OMS running on the computing device.

According to another embodiment of the present invention, a method for purchase of an item from a beacon comprises: providing a multifunctional beacon, wherein said beacon is managed by a beacon management system running on a computer; configuring an item for sale on said beacon using said management system; advertising said item on a display panel on said beacon; choosing of said item for purchase via interaction with an interactive display of said beacon by a user; paying for the item by the user using a mobile device via contactless payment means of said beacon; transferring to said mobile device of directions to the vendor of the purchased item such that the user may follow these directions to arrive at the vendor; when the user arrives at the vendor, detection by said mobile device of a location beacon installed at said vendor; notification of said management system by said mobile device of detection of said beacon; and notifying the vendor of the arrival of the user at the vendor by said management system such that the vendor provides the purchased item to the user.

According to another embodiment of the present invention, a method for guiding a user to a destination comprises: selecting by a user of a distance circle and a category of interest on a mapping application running on an interactive beacon; displaying by the beacon of relevant points of interest within the distance circle and belonging to the category selected; choosing by the user of a destination from the displayed points of interest; determining by the beacon management system of a route from the location of the beacon to the destination; transferring of the determined route to an app on mobile device by wireless transfer means connecting the beacon and device; and guiding of the user by the app to the destination based on the route.

According to another embodiment of the present invention, a method for highlighting a waypoint on a route comprises: determining a route to a destination by a management system of an interactive beacon; wherein the route comprises a waypoint and the waypoint is an interactive beacon; transferring of the determined route to an app on mobile device by wireless transfer means connecting the beacon and device; guiding of a user by the app to the waypoint beacon based on the route; and when the user approaches the waypoint beacon; indicating that the beacon is the waypoint beacon by at least one of: the waypoint beacon provides a visual indication to the user the app captures an image of the beacon on the display of the device and superimposes a visual indication on the image of the beacon.

According to another embodiment of the present invention, a method for capturing photos for display on an interactive beacon comprises: providing a photo app on an interactive beacon; activating of the photo app and taking a photo by a user of the subject in the field of view of the camera of the beacon; uploading of the photo to a management server of the beacon; and displaying the photo on the display of at least one beacon.

The terms beacon, CityBeacon, or kiosk, may be used herein interchangeably along with the descriptors multifunctional or interactive to denote the beacon of the presently described invention.

As used herein an operator refers to the manager of the beacon network, a customer refers to the entity managing the beacons in a specific area—such as a city council or property management company, and a user refers to the individual interacting with the beacon, beacon app on a mobile device, or beacon network. A user refers to the residents, tourists, crowds, pedestrians, etc., that use the services of the beacon. iBeacon as used herein refers to any Bluetooth low energy (BLE) beacon optionally using Eddystone open beacon format or Apple iBeacon any other similar-functionality beacon format or protocol.

Content as used herein may refer to any of images, movies, sound clips, advertisements, music or similar. Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computer", it should be noted that optionally any device featuring a data processor and the ability to execute one or more instructions may be described as a computer, computing device, or mobile computing device, or user device including but not limited to any type of personal computer (PC), a server, a cellular telephone, an IP telephone, a smartphone, a PDA (personal digital assistant), or a pager. A server as used herein may refer to any of a single server, multiple servers, distributed servers or cloud computing environment. Any two or more of such devices in communication with each other may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention is of a system for an interactive multifunctional beacon and more specifically a beacon providing information and communication as well as gathering data from and/or intelligently responding to gathered data about its surroundings and interactions with the beacon or one of its sensors as well as with connected mobile devices. The invention further provides for management and operation of the beacon network.

The multifunctional beacon is provided with a unique enclosure design for deployment in public areas. Each beacon is part of a network of beacons that are centrally monitored and managed by a beacon operator, preferably through a private cloud. Networks of beacons are preferably deployed by the beacon operator and managed by customers who control urban areas including but not limited to cities, malls, airports or campuses, to provide information, communication, and services to users in the vicinity of the beacon as well as to gather data about the environment surrounding the beacon for the operator and the beacon network customer.

The beacon preferably comprises specific hardware including but not limited to: large video displays including touch screen functionality; cameras; street lighting, local lighting, status lighting; power and UPS; speakers and microphones, environmental monitoring; programmable buttons; commerce enablers such as an NFC panel and Bluetooth connections; communication hardware including antennas, transceivers and cable/optical connection systems; and computing hardware.

The beacons are centrally managed by a SmartCity Operations and Management System (OMS) which comprises a central OMS backend and distributed OMS frontend components. The OMS frontend comprises modules including but not limited to: security and audience tracking, hyperlocal interactive content management, emergency and alerting, UPS management, app store management, and payment, coupon and ticketing enablers.

The beacon network run by the OMS preferably provides functionality including but not limited to:

Information such as advertising, interactive applications that adapt based on proximity and interactions of users to/with the beacons, maps with points of interest (POI), timetables, and similar;

Communication using multiple protocols and interconnections such as mesh communication, WiFi, video calling, ibeacon/Bluetooth, NFC, cable, fiber, and similar;

Security and surveillance such as camera surveillance, emergency calls, and public alerts and announcements;

Environmental monitoring such as local temperature, air quality, and other measurements;

Ecommerce applications and enablers for purchases and payments; and

An application platform for apps provided by the beacon network operator and selected by the customer or operator for deployment on the network.

Figure 1A:
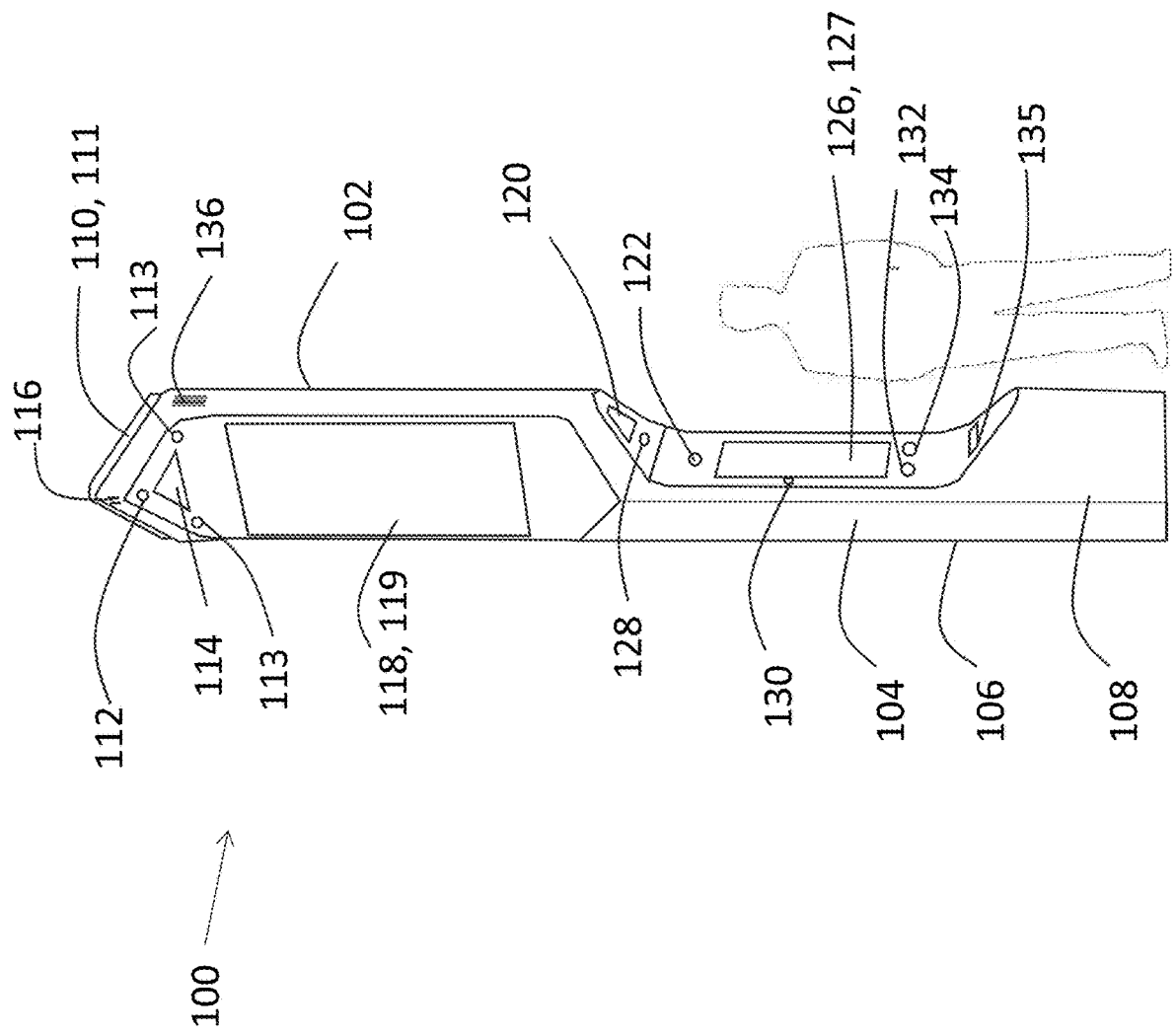
FIGS. 1A-1N are schematic illustration of a multifunctional beacon according to at least some embodiments of the present invention.

Reference is now made to FIGS. 1A-1N, which are schematic illustration of a multifunctional beacon according to at least some embodiments of the present invention. As shown in FIG. 1A, the beacon 100 comprises an enclosure fitted with internal and external components. The beacon 100 and components are monitored and operated via an Operations Management Systems (OMS) herein referred to as the SmartCity OMS frontend as described further below. The dimensions of the enclosure and positioning of components as described below should be considered illustrative and non-limiting.

Beacon 100 is preferably deployed in outdoor public areas and therefore the enclosure and components are preferably both weatherproof and also vandal-proof. Alternatively, beacon 100 is deployed in indoor environments such as malls or airports.

Weather proofing includes use of appropriate materials such as stainless steel or sun-resistant plastics. Vandalism proofing preferably includes screen covers made of strengthened glass, PMMA or similar. The enclosure is also covered with an anti-graffiti, anti-sticker coating such as those based on polyurethanes, nano-particles, fluorinated hydrocarbons, or siloxanes. This coating may optionally also be hydrophobic and provide resistance to UV aging and weathering.

Figure 1F:
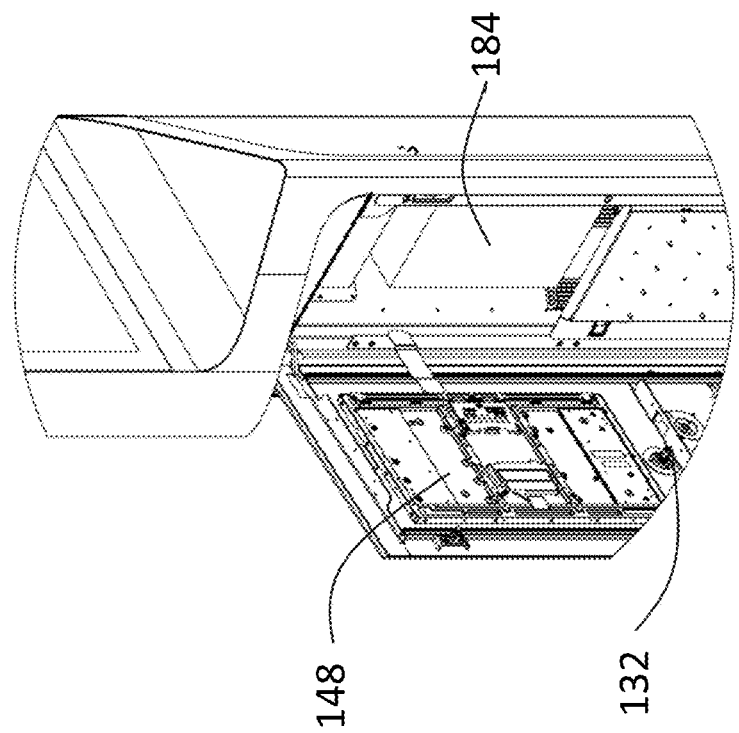
Figure 1E:
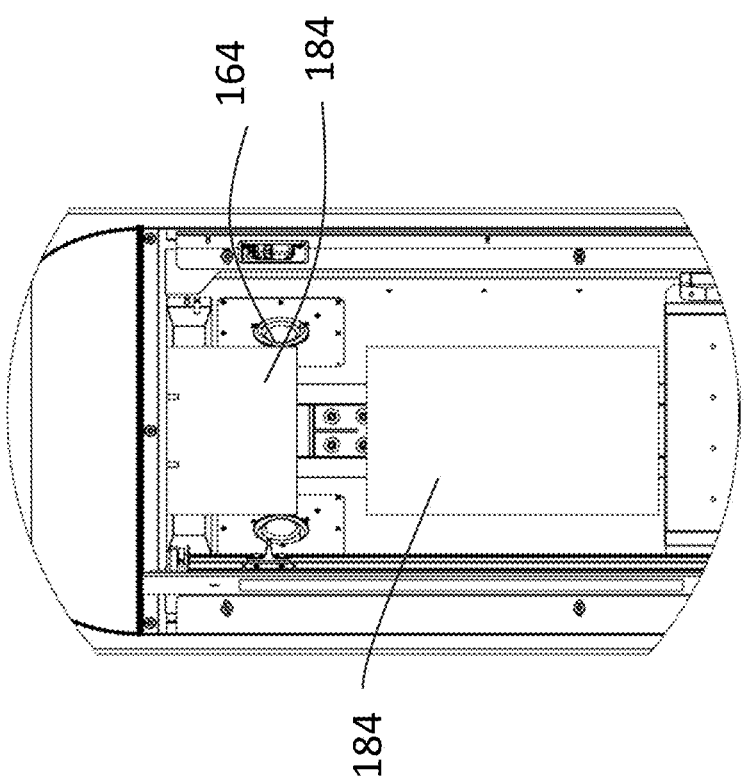

Beacon 100 is preferably symmetrical in its upper half 102 with the same components on either side but is not symmetrical in its lower half 104 where there is a front-facing user interface with a solid back 106 on the opposite side. The solid back 106 provides better support for the beacon and also allows room for internal equipment to be housed in lower half 104. Optionally, the beacon may be provided with a symmetrical lower half as shown in FIG. 1L. The beacon 100 is managed via a beacon management system running on one or more beacon processing units which are computers as described above and are housed within the enclosure of beacon 100. Beacon management is described with reference to FIGS. 2A and 2B below.

The components of beacon 100 as described below preferably all comprise reduced power capabilities for selective deactivation or switching to a minimal power setting to reduce the overall power consumption of the beacon 100. Such power reductions may be activated, for example, at times of day when the beacon environment is closed to pedestrian traffic and/or when reduced pedestrian traffic is expected and/or detected. Non-limiting examples might include dimming or switching off of lights and displays.

Beacon 100 is fitted on its top with a status light 110. Status light 110 comprises a bright long-life lighting element such as a multicolor (RGB) LED array attached to or installed under a neutral colored top cover 111. In operation, status light 110 can preferably be any color as required by the current status of the beacon or its surroundings. Optionally, status light 110 may be amber or red to signal a warning or emergency situation. Optionally, the color of status light 110 may change continually, may flash, or may be set based on the time of day or a specific holiday or day of the year. Optionally the color of status light 110 may be related to the "city mood" with color controlled based on intelligent programming as described below.

Beacon 100 is fitted with a dome camera 112 on each side at its top. Each dome camera 112 can be remotely controlled with pan, tilt, and zoom functionality to view items or surroundings in the field of view of the camera. Additionally, at least two audience tracking cameras 113 are also mounted at the top of beacon 100 on each side (at least four tracking cameras 113 combined). Tracking cameras 113 working together capture all activity for 360 degrees around the beacon 100. Analysis of the images captured by the dome cameras 112 and tracking cameras 113 is further described below. Optionally, more than two cameras are provided. The dome cameras 112 and tracking cameras 113 are used alone or in conjunction with user facing cameras 122 (described below) for audience tracking, crowd control, demographics, surveillance, and other visual data collection such as license plate scanning. Optionally cameras 112 and 113 include low-light or infrared sensing capabilities.

Adjacent to dome camera 112 is a street light 114 comprising an adjustable brightness long-life lighting element such as a multicolor (RGB) or single color LED array or combination of these. Optionally, light 114 is controlled as part of the lighting in the area surrounding the beacon 100. Optionally, light 114 is part of an intelligent Internet-connected street lighting system or a lighting system 600 as described further below. As upper half 102 of beacon 100 is symmetrical, street light 114 is also present on the other side (not shown) of beacon 100.

Figure 1G:
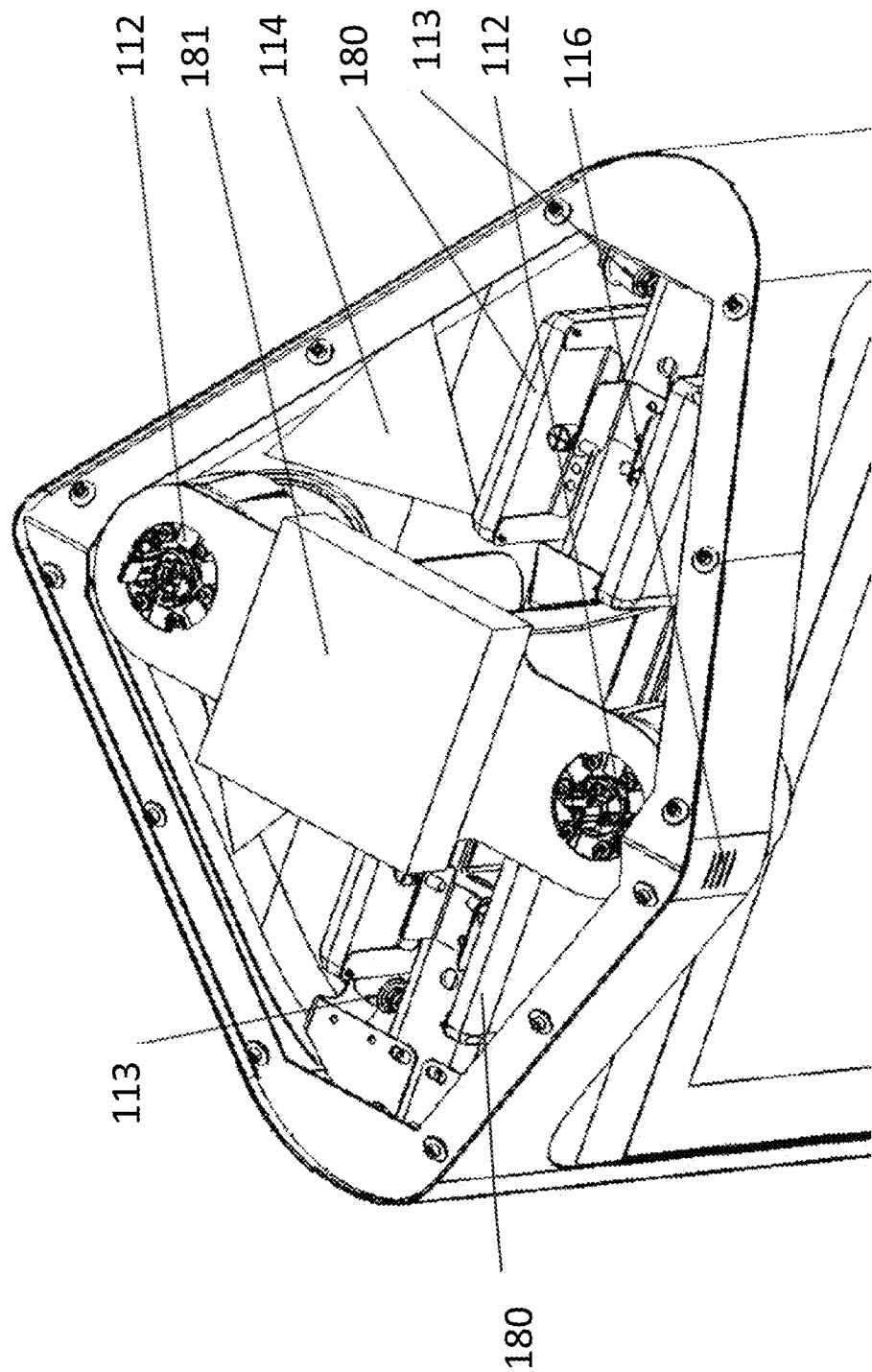

Hidden within the upper part 102 of beacon 100 are preferably one or more antennas such as antennas 180 and 181 of FIG. 1G for the communication transceivers (such as transceiver 184 of FIG. 1E) housed within the beacon. The antennas are preferably any one or more antennas, for example, a dipole antenna, a monopole antenna, an omni-directional antenna, an end fed antenna, a circularly polarized antenna, a micro-strip antenna, a diversity antenna, or the like. Optionally, the transceivers (not shown) are also located in the upper part 102 of beacon 100.

Communication network protocols supported by the antennas and transceivers preferably include any combination of wired or wireless network technology including WiMAX, EV-DO, RTT, Flash-OFDM, iBurst, HSPA, EDGE, GPRS, GPS, WiFi, UMTS, LTE, Bluetooth, ibeacon, NFC, Zigbee, or similar. These technologies may be combined or used in any network including but not limited to a local area network, a wide area network, a wireless data network a cellular network and/or any combination of the aforesaid networks, which may optionally be private or public networks. Preferably, a high-gain antenna is provided to support long range WiFi. Preferably, low power modes are provided for all transceivers to save on power needs when these are not in use.

Optionally, the transceivers and/or antennas are housed inside the lower half 104 of beacon 100 (as in FIGS. 1C, 1E, 1F). Preferably, lower range technologies such as Bluetooth are housed inside the lower half 104 of beacon 100. Optionally, the transceivers are mounted in standard 19 inch racks inside beacon 100. Optionally rack space may be rented out to third-parties such as cellular operators who may install transceivers and antennas within beacon 100. Optionally a single antenna 180 may be shared by multiple operators with separate transceivers.

Connectivity to wired communications networks is preferably provided through the base 108 of beacon 100. Non limiting examples include Fiber, DSL, or Cable. Preferably, more than one connection is provided for redundancy purposes. Modems for wired communications are housed inside lower half 104 of beacon 100.

Beacon 100 includes environmental sensors 116. These may be positioned as shown on upper half 102 of beacon 100 or may alternatively be positioned anywhere internally or externally attached to beacon 100. Sensors 116 preferably include sensors for temperature, humidity, air pressure, $CO_2$ level, air pollution concentration levels, pollen levels, UV radiation, lighting intensity, or similar sensors for providing information about the environment outside of beacon 100. Optionally, the sensor functionality may be combined into a single hardware component or optionally multiple sensors each with different functionality are provided. Beacon 100 preferably comprises internal sensors 162 (FIG. 1K) to monitor the internal environment of beacon 100 such as temperature and humidity.

Two upper displays 118 are provided on either side of beacon 100. Displays 118 are preferably high definition resolution (1,920×1,080 pixels progressive scan) displays with a 55 inch diagonal. Optionally, displays 118 may be of any size or aspect ratio within the dimensions of beacon 100. Optionally displays 118 may be any resolution including 2160p or 4320p or any future resolution standard. Optionally more than two displays are provided. Optionally, multiple displays are provided and further optionally these displays are adjacent to one another so as to create a larger display. Upper info displays 118 are covered with a transparent polycarbonate cover 119 such as Lexan® or similar to provide protection for the displays. Cover 119 also features infrared protection to reduce heating of the displays. Optionally a sensor is provided to detect breakage of the cover 119.

Upper displays 118 are used primarily to display static image, text, or video advertisements, but may also be used to display static or video warnings or announcements. Preferably, the content displayed on each of upper displays 118 is different, or alternatively may be the same. Upper displays 118 are raised so as to be visible above vehicle and pedestrian traffic. The lowest edge of upper displays are preferably higher than 1.5 m above the base of the CityBeacon.

Lower light 120 comprises an adjustable brightness long-life lighting element such as a multicolor (RGB) or single color LED array or combination of these. Optionally, light 120 is controlled as part of the lighting in the area surrounding the beacon 100. Optionally, light 120 is part of an intelligent Internet-connected street lighting system such as lighting system 600 described below.

User interactivity with beacon 100 takes place on the front-facing side of lower section 104. As above, the lower half 104 of beacon 100 is optionally symmetrical and in such a case all components described here are duplicated on the opposite side. At least one user facing camera 122 is provided to capture close-up views of the user enabling eyeball and gesture tracking, video calling, and audience analytics. Camera 122 is preferably positioned at face height of the average adult user. Optionally, more than one camera is provided. Optionally camera 122 includes low-light or infrared sensing capabilities.

Lower display 126 is preferably ultra-high definition resolution (3840×2160 pixels progressive scan) displays with a 32 inch diagonal. Optionally, display 126 may be of any size or aspect ratio within the dimensions of beacon 100. Optionally display 126 may be any resolution including 4320p or any future resolution standard. Display 126 comprises a touch panel 127 using any suitable touch or multi-touch technology allowing user interaction with the GUI, applications or content presented on display 126. Display 126 is optionally used to display any form of content, but may also be used to display static or video warnings or announcements. Optionally, display 126 also comprises a protective cover.

Adjacent to display 126 are speakers 128 and microphone 130. Speakers 128 are preferably directional speakers enabling only the user directly in front of the beacon 100 to hear audible content therefrom. Optionally, only one speaker is provided, optionally more than two speakers are provided. Microphone 130 enables users to use voice based communication via beacon 100. Preferably, microphone 130 is directional, capturing only the sounds made by a user interacting with the front of beacon 100. Optionally, microphone 130 may be used to capture audio from the area surrounding beacon 100. Optionally, more than one microphone is provided. Microphone 130, camera 122 and/or speakers 128 may be located as shown or at any position suited for their purpose proximal to display 126.

Beacon 100 optionally includes one or more high power speakers 136 in upper half 102 for broadcasting of announcements, warnings or audio content. Beacon 100 optionally includes additional microphones (not shown) in upper half 102 for capturing audio from the area surrounding beacon 100. Optionally, a vibration device may be attached to the enclosure such that the entire enclosure functions as a speaker. Optionally, beacon 100 includes one or more sirens (not shown) such as air raid sirens.

Beneath display 126 is at least one push buttons 132. Preferably, three push buttons are provided. Optionally, up to 10 buttons may be provided. Button 132 comprises a programmable display enabling button 132 to change its functional operation depending on the application in use by displaying an appropriate pictogram. Preferably, button 132 has default operations when not in use for applications. Such default operations preferably include an emergency button, video call button and beacon operator call button. Optionally, different functionality is provided depending on whether button 132 is pressed once, "double-pressed, or pressed for an extended period of time for example 1-2 seconds.

Button 132 is preferably surrounded by a colored ring (not shown) where the color is generated by a color changing light source such as an array of RGB LEDs. Surrounding ring preferably changes color to match the color of interactive elements shown on display 126, to indicate to a user that button 132 corresponds to an interactive element shown to the user on display 126.

Adjacent to button 132 is an interactive panel 134. Panel 134 preferably uses NFC (near field communication) or other wireless protocols for ticketing (such as using MIFARE), loyalty, information transfer or payments by devices that use compatible technology. Panel 134 preferably comprises a display to indicate details related to the data transfer or transaction. Alternatively, panel 134 comprises any other form of contactless or other payment mechanism including but not limited to a card reader, or scanner or similar. Beneath button 132 is a wireless charging pad 135 for charging of mobile devices. The charging pad may, for example, make use of Qi or any other wireless charging standard.

Beacon 100 preferably comprises a UPS battery system (not shown) housed in base 108 of beacon 100. Optionally, the UPS comprises modular battery components to allow simple addition of more backup power to each beacon. The UPS is preferably fed by grid electricity entering via the bottom 108 of beacon 100 where power distribution 182 (FIG. 1C) comprises at least an energy meter and appropriate electricity protection components such as circuit breakers and earth fault protection. Optionally renewable energy sources such as solar power are provided within, upon, or adjacent to the beacon 100 to provide power. Beacon 100 preferably comprises charging ports (not shown) for charging of electric vehicles. Data from charging ports is preferably provided to the beacon operating systems and backend to enable notification of users via their mobile devices when vehicle batteries are charged. Additionally, the electricity usage is metered and can be paid for using the NFC panel 134 on the beacon or via mobile pre or post-paid methods.

FIGS. 1B-1G are illustrative schematic side, front and perspective views of beacon 100 shown with open access panels according to at least some embodiments of the present invention. As shown, the internal components of beacon 100 are accessed by opening lower front door 105, by swinging displays 118 upwards, and by removing covering 111 from the top of beacon 100. Additionally or alternatively, back 106 may be removable.

Front door 105 is preferably locked using electric locks 156, which may be unlocked remotely or by a local technician with a suitable device and/or application. Optionally, an authorized technician may unlock the beacon 100 by passing a mobile device with appropriate software over panel 134.

As shown, beacon 100 comprises the following internal components visible in FIGS. 1B-1G (some components are shielded by cover 151):

Antenna arrays 180 and 181 mounted under top cover 111 for use in cellular and/or WiFi communication or for any other wireless technologies or protocols as described above;

Fans 164 comprising exhaust fans for expelling warm air from the interior of beacon 100;

Power distribution 182, as describe above;

Cellular transceivers 184 where two cellular transceivers 184 are shown. Beacon 100 preferably accommodates up to five cellular transceivers 184. Beacon 100 optionally accommodates more than five cellular transceivers 184

Figure 1H:
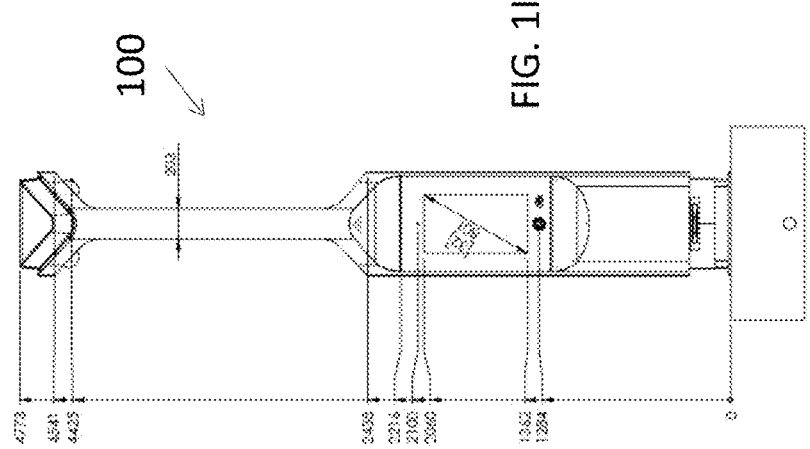
Figure 1I:
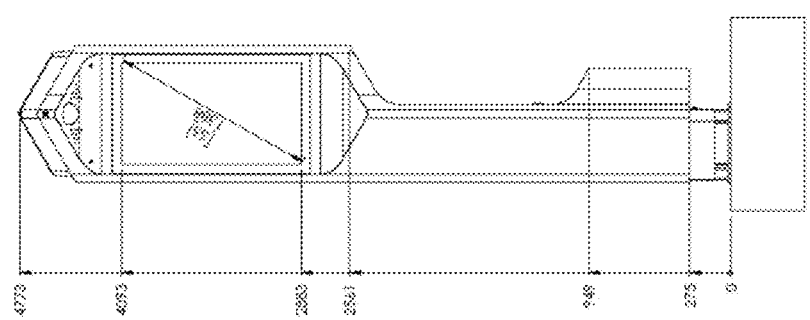
Figure 1J:
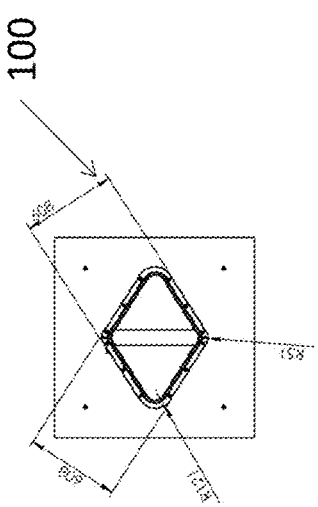

Computers 144 and 146, network switch 170, power supply units 150, display control 148, and touch control circuitry 149 as described further below with reference to FIG. 1K;

FIGS. 1H, 1I and 1J are illustrative schematic side, front and plan views of beacon 100 showing preferred dimensions according to some embodiments of the present invention. The dimensions shown should not be considered limiting.

Figure 1K:
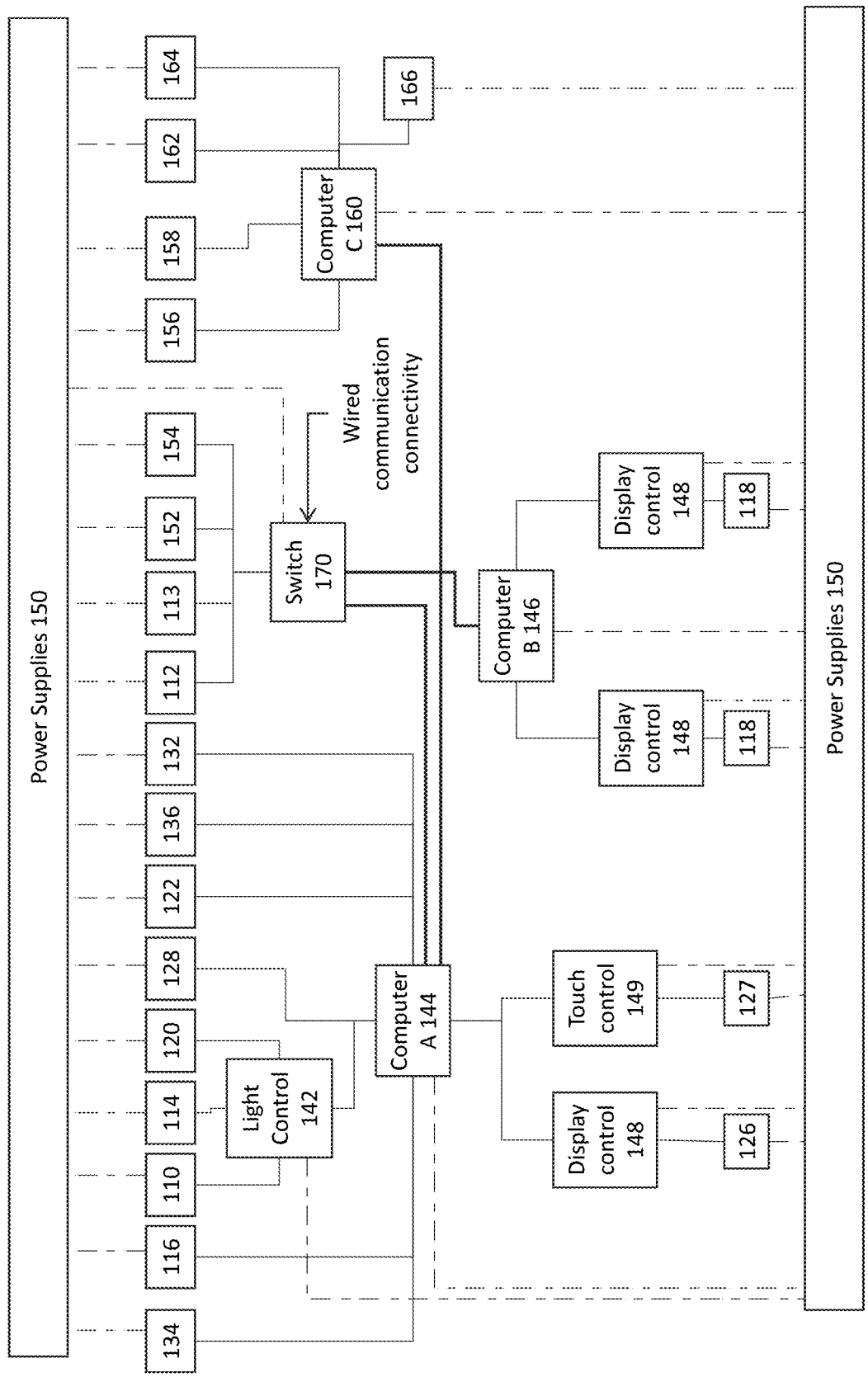
Figure 1L:
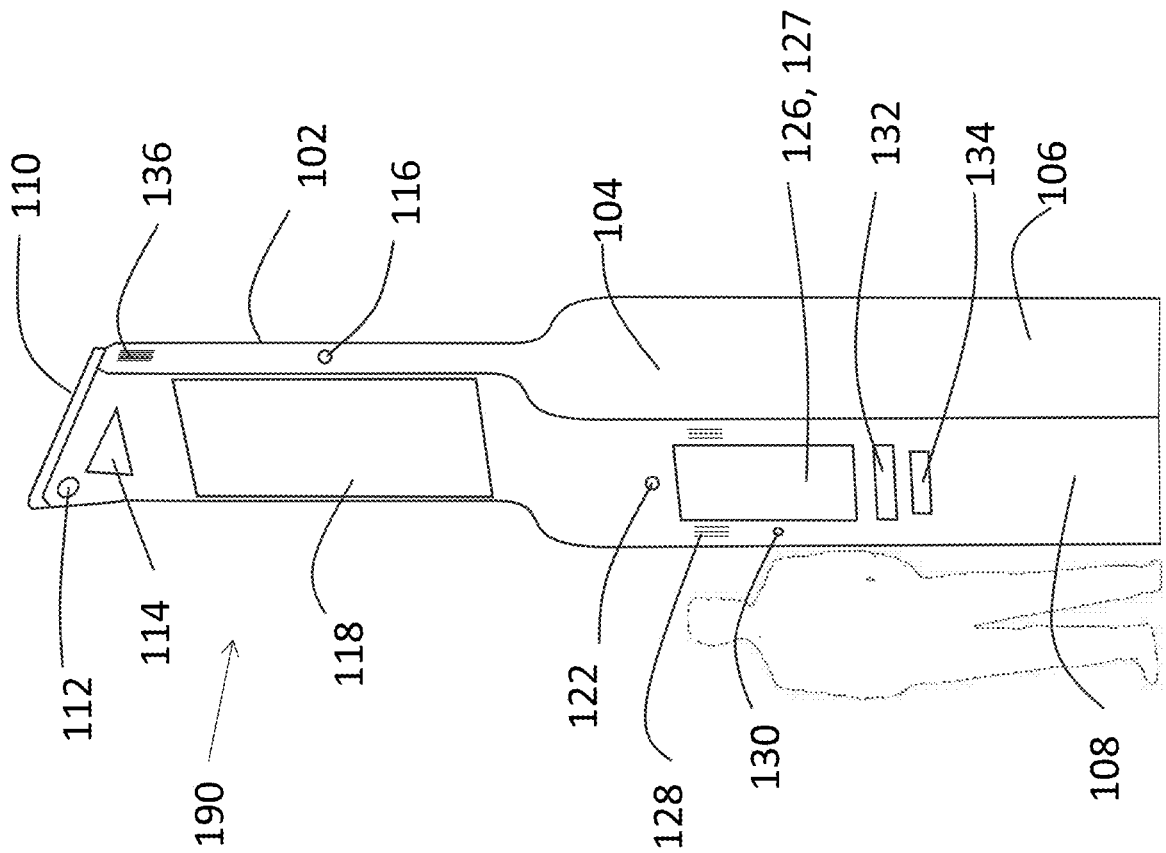

FIG. 1K is an illustrative hardware interconnection diagram for a beacon according to some embodiments of the present invention. As shown, in FIG. 1K, beacon 100 comprises at least three computers A 144, B 146 and C 160.

Network switch 170 interconnects computers A 144, and B 146 as well as cameras 112 and 113, WiFi access point/router 152 and cellular communication transceivers 154. Switch 170 is also connected to wired communications networks such as described above.

Computer A 144 is interconnected with and controls environmental sensor 116, speakers 136 and 128, camera 122, lighting controller 142 to control lights 114 and 120 as well as status light 110, panel 134, button 132, lower display 126 via display controller 148, and touch panel 127 via touch controller 149.

Computer C 160 primarily performs enclosure management and is itself controlled by computer A 144. Computer C 160 is interconnected with and controls electric locks 156, tilt sensor 158, internal environmental sensors 162, cooling and exhaust fans 164 and heater 166. Tilt sensor 158 detects movement of the beacon 100 enclosure such as caused for example by a seismic event or by vandalism. Heater 166 preferably heats the interior of beacon 100 such as when outside temperatures are very low.

Computer B 146 is interconnected with and controls upper displays 118 via separate display controllers 148.

Power supply subsystem 150 is fed by power distribution 182 (FIG. 1C) and comprises a plurality of power supplies generating a range of voltages and with varying power limitations to supply power to the hardware components shown in FIG. 1K.

FIGS. 1L, 1M, and 1N are illustrative illustrations of multifunctional beacons according to at least some embodiments of the present invention. FIG. 1L shows a beacon 190 with an alternative enclosure to that of FIG. 1A, but with the same functionality. FIG. 1M shows a beacon 192 primarily for information display comprising at least one display 118. Status light 110, and light 112. Beacon 192 also comprises a camera 195 comprising the functionality of cameras such as cameras 112, 113, and 122 described above. FIG. 1N shows a beacon 194 with the primary functionality of lower half 104 of beacon 100 comprising at least one display 126, touch panel 127, button 132, status light 110, and light 112.

Similarly the enclosure may take any suitable form and may include part or all of the functionality described above and the embodiments shown should not be considered limiting.

Figure 2A:
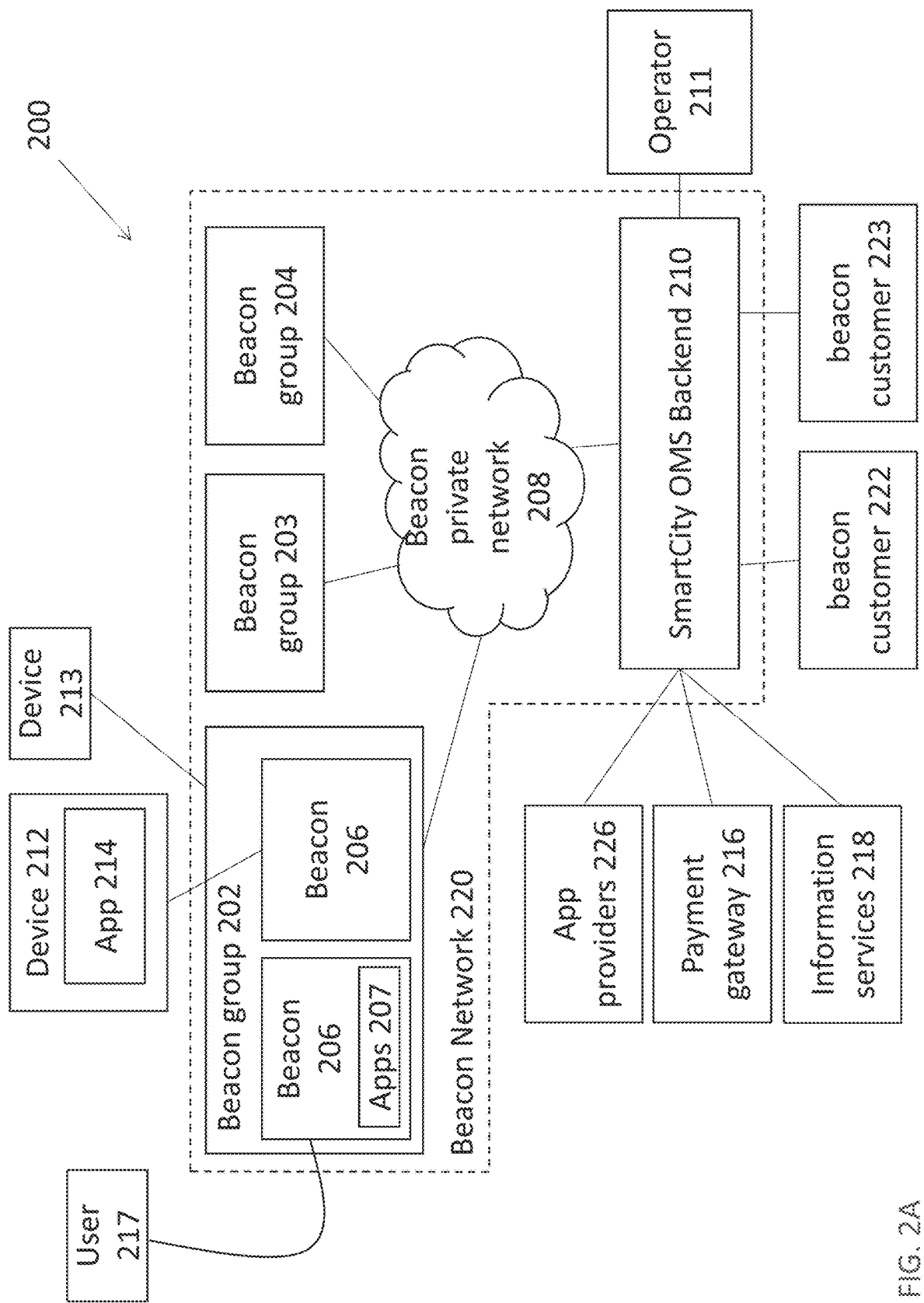
FIGS. 2A-2C are schematic block diagrams showing a system for operation and management of multiple beacons according to at least some embodiments of the present invention.
Figure 2B:
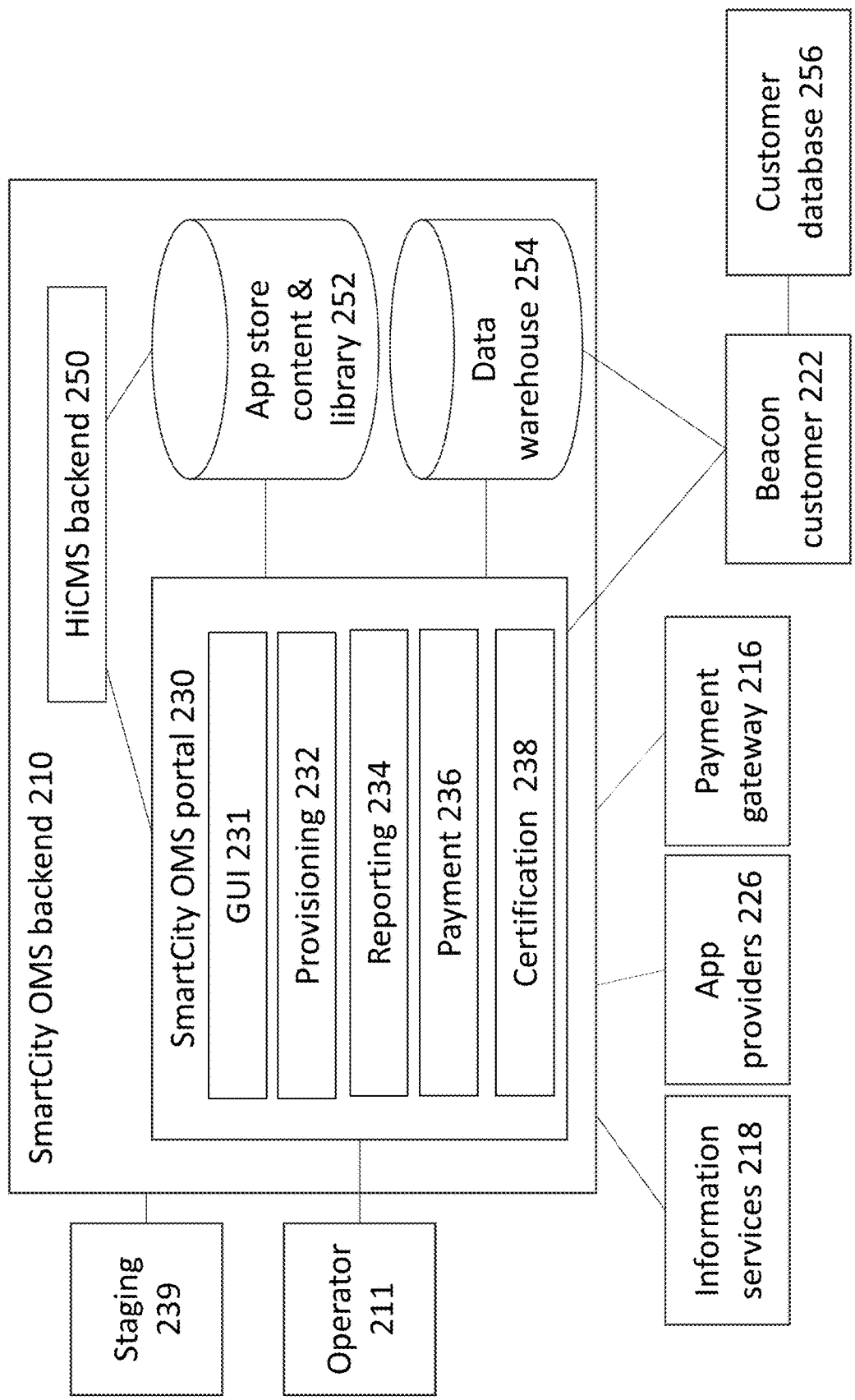
Figure 2C:
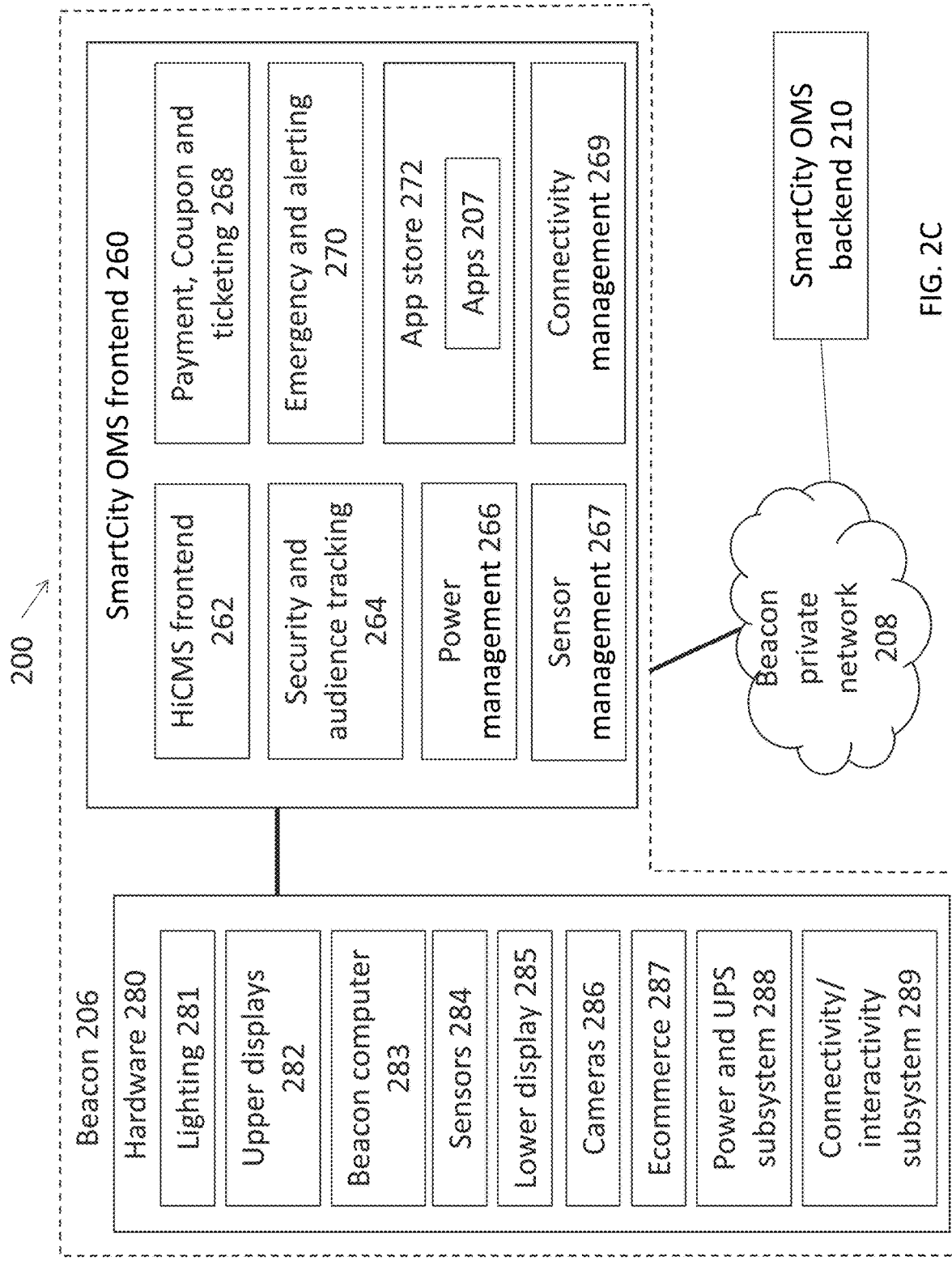

Reference is now made to FIGS. 2A-2C which are schematic block diagrams showing a system for operation and management of multiple beacons according to at least some embodiments of the present invention.

As shown in FIG. 2A, beacon system 200 comprises a beacon network 220 connected to external entities, devices and systems. In a preferred arrangement a beacon operator 211 builds, and operates beacon network 220. Beacon network 220 preferably comprises beacon groups such as beacon groups 202, 203, and 204, beacon private network 208 and SmartCity OMS 210. Beacon groups comprise beacons 206 such as beacon 100 described above. Beacon 206 may alternatively be any similar beacon such as beacon 100 but with reduced functionality or provided in a different enclosure. Beacon 206 runs one or more apps 207 on beacon CPU 283.

Beacon network 220 is managed and operated by a distributed operation and management system herein referred to as SmartCity OMS or simply OMS. SmartCity OMS is divided into a server portion, SmartCity OMS backend 210 which runs on a single server or distributed servers or other computer as describe above, and SmartCity OMS frontend which runs on each beacon using beacon CPU 224 as described below.

Beacon operator 211 manages the beacon network 220 including performing functions including but not limited to: network monitoring, incident management, advertising agreements, content upload, beacon provisioning, customer management, app certification, and security.

Beacon customer such as customers 222 and 223 rents or buys a group of beacons such as beacon groups 202, 203, and 204, that has been established in a geographic area or group of geographic areas. For simplicity, beacon group 202 will herein refer to any beacon group and beacon customer 222 may refer to any beacon customer. Beacon customer 222 is then provided with an interface to manage their beacons 206 and beacons groups 202 as described further below.

Non-limiting examples of beacon customer 222 are any entity such as a government, urban area management, city council or a property, mall, or airport management company or a university campus. In these non-limiting examples, beacons groups 202 would be deployed in geographical areas, or buildings managed or controlled by these entities.

Network 208 is preferably a virtual private network (VPN) providing encrypted communications between beacons 206 and also between beacons 206 and OMS backend 210. Network 208 may be based on any underlying network technology such as those described above and VPN may use any VPN technology known in the art. OMS backend 210 may manage any number of beacons 206.

Users, such as user 217 interact directly with each beacon via, for example, the display 285, and preferably also using their own mobile devices 212 and 213 such as smartphones or similar computing devices as defined above running a suitable software application 214 (also referred to as an app 214). The app is preferably a dedicated software application but may optionally be a webpage providing the same or similar information within the limitations of the technology. The dedicated app will be able to provide much richer functionality such as but not limited to a built in VPN, proximity related push services, and NFC related functions. App as used herein may refer to either the dedicated app or Web interface. Devices 212 and 213 may optionally be any device interacting with the beacon 206 or beacon group 202 including but not limited to mobile communication devices such as smartphones, vehicles such as drones or cars, or parking meters, IoT devices or similar.

OMS backend 210 is preferably connected to at least one payment gateway 216 for processing of payments received such as from ecommerce module 287. OMS backend 210 is also optionally connected to external information services 218. These could include, for example, weather information or traffic information provided by $3^{rd}$ parties and used in the operation of the beacon network 220. OMS backend 210 is also connected to App providers 226 who provide apps such as app 207 for running on beacon 206.

Reference is now made to FIG. 2B which is a schematic diagram illustrating the OMS backend 210 of the beacon network 220 according to at least some embodiments of the current invention. The OMS backend 210 comprises:

Hyperlocal Interactive Content Management System (HiCMS) backend 250 which analyzes data collected by beacons 206 and controls the content displayed on, or other activities of beacons 206. Content deployed by HiCMS backend 250 is optionally also scheduled content or may be intelligently chosen based on data collected by the beacon or the environment of the beacon. In a non-limiting example, in rainy weather, advertisements shown on the beacon displays would relate to water-resistant clothing;

SmartCity OMS portal 230 which provides a GUI 231 for customers 222 to customize the beacons 206 under their control and to analyze data collected by beacons 206. The GUI 231 of portal 230 provides provisioning 232, reporting 234, payment 236, and certification 238 modules. The GUI 231 is optionally provided via a web interface on a computer display. These modules are also used by the beacon network operator 211 for similar purposes. Portal 230 provides different levels of access depending on the customer 222 personnel, or operator 211 personnel both of whom need to log into the portal 230, and thus changes made to the operation and management of the network 220 may be limited or more flexible depending on the specific access rights of the personnel.

Figure 2D:
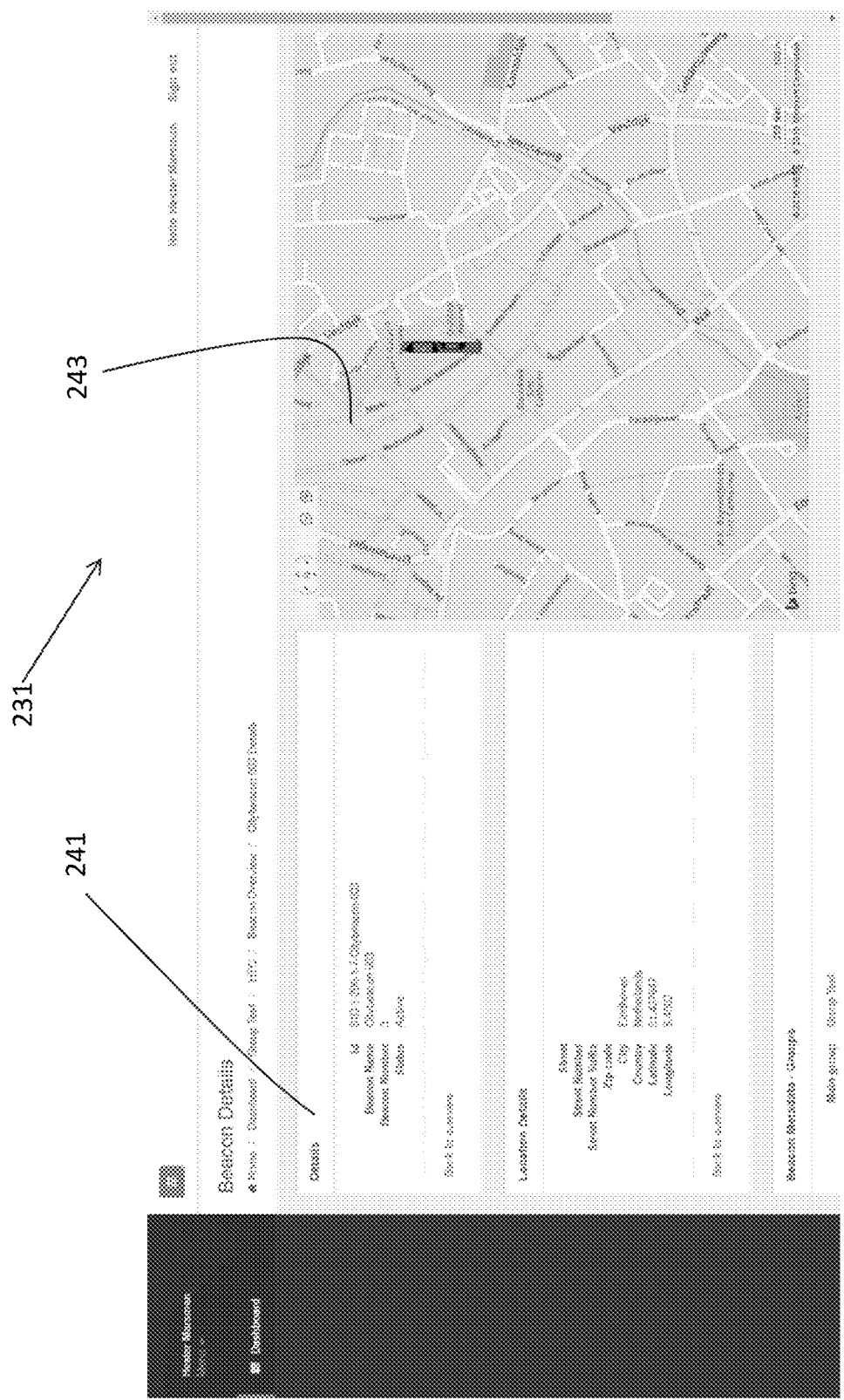
FIGS. 2D-2E are exemplary screenshots of a system for operation and management of multiple beacons according to at least some embodiments of the present invention.
Figure 2E:
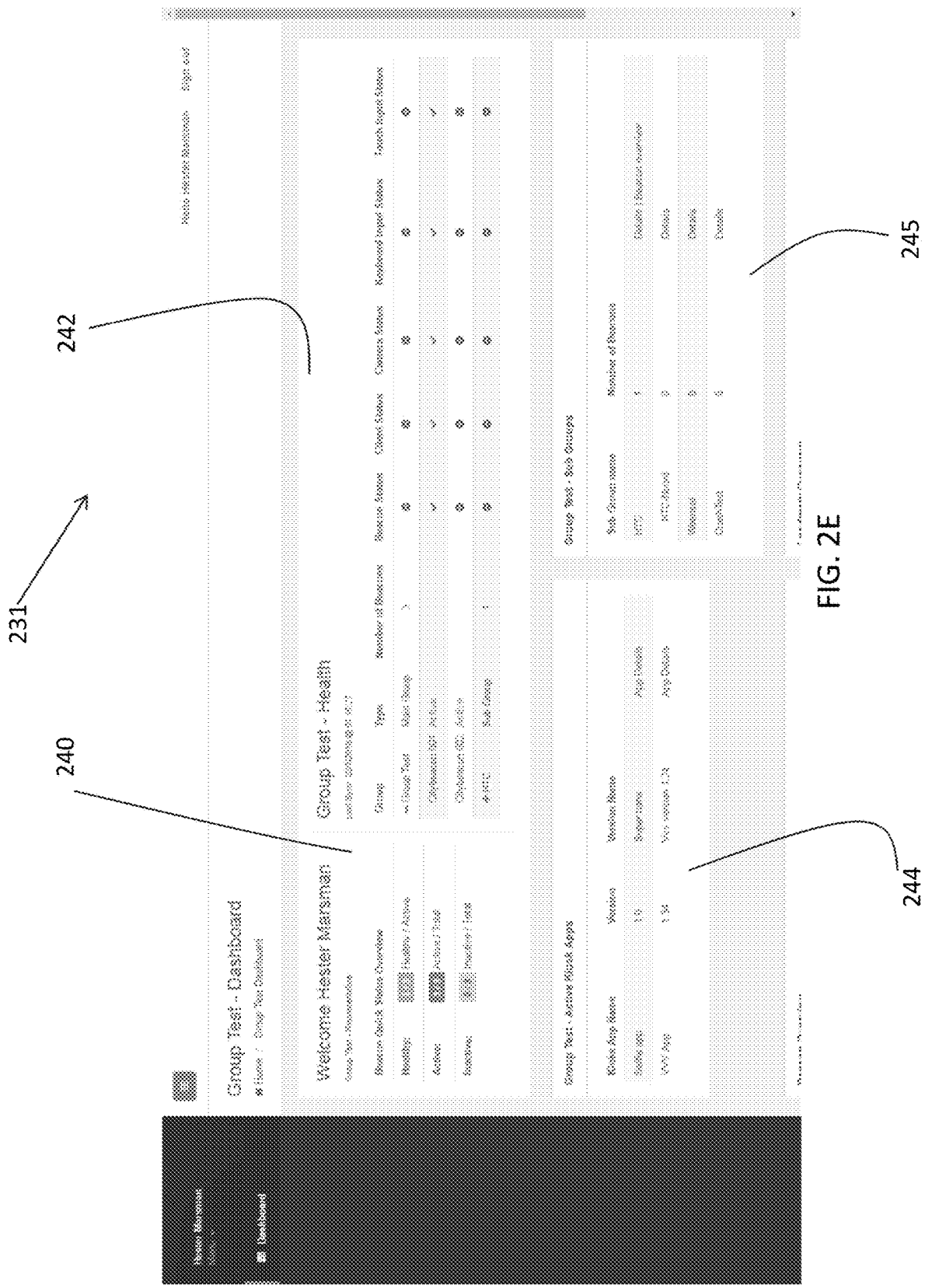

FIGS. 2D and 2E are non-limiting exemplary screenshots of a GUI for managing a plurality of beacons according to some embodiments of the present invention. As shown in FIG. 2D, a provisioning module 232 of GUI 231 provides viewing and editing pane 290 for entry or viewing of details about a particular beacon, including information such as the beacon name, location, status and grouping. A map view 243 shows the geographical position of the beacon being viewed. As shown in FIG. 2E, the GUI 231 provides information about the status of the members of a beacon group in 240 and 242, a listing of apps installed in 244 and a listing of subgroups in 245.

Provisioning module 232 enables customers 222 to define what applications, such as app 207, are provided for running on beacons 206. App 207 utilizes APIs to access functionality and hardware of beacons 206. Apps are selected from those available in the app store library 252. Customer 222 views a list of available apps and can access more information describing each app. Customer 222 can then choose to deploy an app to one or many of the beacons 206 that they manage.

Provisioning module 232 also enables provisioning of functionality, data and features of apps 207 running on beacons 206. In a non-limiting example, customer 222 might configure specific rates for a parking meter app running on beacon 206.

Provisioning module 232 further enables provisioning of content on beacons such as advertisements or announcements for display, such as on upper displays 282. Provisioning module 232, optionally provides for power management settings such as times of day or beacon surrounding conditions wherein beacon 206 or individual components of beacon hardware 280 enter low-power or full-power modes, or start up or shut down in order to reduce beacon energy usage;

Reporting module 234 enables reporting to customer 222 via the portal 230 of the status of beacons 206 as well as data collected by beacons such as by sensors 284. Reports are presented via GUI 231 of portal 230 preferably using presentation such as graphs or tables of data or status indication on geographic maps. Reported data from beacons 206 is gathered and processed by HiCMS backend and stored in data warehouse 254. Customer 222 can optionally access data warehouse 254 directly to export raw data to a customer database 256 for storage and further processing and analysis. Data warehouse also stores all beacon system 200 related data such as beacon deployment data, customer data and user data;

Payment module 236 enables customer 222 to define allowable payment means, payment agreements and tariffs, and data related to payment gateways such as payment gateway 216; and Certification module 238 enables customer 222 or operator 211 to review apps or content for inclusion in library 252. In a non-limiting example, app providers 226 submit apps for running on beacons 206 such as apps 207 which are then previewed and certified by operator 211 before being made available in library 252 for deployment. Optionally, a staging environment 239 is provided for testing and configuration of an app before deployment.

App Store Content & Library 252 provides the customer 222 with a choice of available content and apps for displaying or running on beacons 206.

As shown in FIG. 2C, beacon 206 comprises hardware as follows. Although examples based on FIG. 1 as described above are provided, it should be appreciated that beacon 206 may comprise any configuration of hardware such as a subset of the features of FIG. 1 to suit the particular deployment needs:

Lighting 220 such as lights 114 and 120 as well as status light 110;

Upper displays 282 such as upper displays 118;

Beacon computer 283 is housed within beacon 206 and provides a platform for operation of SmartCity OMS frontend 260. All hardware 204 is connected to computer 224 allowing control and monitoring by OMS frontend 260. Computer 283 also directs communication from all hardware 280 and software modules on beacon 206. Computer 283 is a computing device as defined above. Computer 283 may comprise multiple computers as illustrated in FIG. 1K;

Sensors 284 such as sensors 116, 158 and 162;

Lower display 285 such as display 126;

Camera system 286 such as cameras 116, 113, and user facing camera 122;

Ecommerce panel 287 such as panel 134;

Power and UPS Subsystem 288 such as the UPS and batteries as described above including power distribution 182 and power supplies 150; and Connectivity and interactivity subsystem 289 comprising the communications means such as described above, including Bluetooth, ibeacon and WiFi, as well as button 132, microphone 130, speakers 128, speakers 136, and touch panel 127.

All software modules that form part of SmartCity OMS frontend 260 are in communication with associated hardware, either directly or via computer 224. The connection between hardware 280 and software modules as described below should be considered as a matrix arrangement where any software module can optionally control or monitor any hardware component. OMS frontend 260 addresses security by preferably deterring users from maliciously attacking or hacking into the beacon. OMS frontend 260 preferably prevents misuse of the provided features and limits non malicious users to specific, predetermined activities. SmartCity OMS frontend 260 comprises:

Security and Audience Tracking System 264 which preferably stores and buffers camera feeds inside the beacon 206 and then relays these to the backend 250;

Hyperlocal Interactive Content Management System (HiCMS frontend) 262 which receives instructions and content from the HiCMS backend 250 as described below;

Emergency and Alerting Subsystem 270 preferably monitors and controls hardware components such as connectivity/interactivity Subsystem 289, camera system 286 and status lighting 281 for use in emergency situations;

Power management 266 monitors the status and charge level of the batteries inside the beacon 206. In case of a failure of the grid electricity supply an order of shutdown precedence can be assigned by UPS management 266 to keep chosen functionality operational. For example, a tiered shutdown can be executed such as first powering down the lower display 285, then one upper display 282, followed by the second upper display 282 and then the WiFi transceiver until the entire battery supply is exhausted or grid power returns. Optionally, the preferred order of shutdown precedence can be defined and set for all beacons connected to the backend 250.

Power management also monitors optional renewable energy sources attached to or integrated into beacon 206 so as to determine when these are to be used or when grid power is to be used.

Sensor management 267 collects data from sensors 284 either by polling sensors 284 at predetermined intervals or by receiving data pushed from sensors 284. Sensor management 267 transfers collected data to backend 210. Optionally sensor management 267 performs calculations locally enabling decisions about beacon activity;

Connectivity management 269 manages the communications networks supported by the beacon and the connections to devices, other beacons, and the private network 208. Additionally Connectivity management 269 monitors and manages the connectivity to broadband cable, DSL or fiber networks. Beacon connectivity is further described with reference to FIG. 3 below;

App Store 272 controls the display and operation of applications such as apps 207 running on the beacon as defined in portal 230 where the apps may be displayed and used via lower display 285 or may be background apps that have no user interface. Apps 207 may be external—presenting a user interface via display 285—or may be internal—running on beacon 206 but not presenting any user interface. A non-limiting example of an external app might be a tourist information app allowing a user to learn about the city where the beacon group 202 is located. In such a case a user can interact with the app via display 285. An example of an internal app might be a pollution data gathering app that runs in the background collecting data about air pollution from sensors 284 for upload and analysis by backend 250 and for presentation via reporting module 234 of portal 230; and Payment, Coupon and Ticketing 268 controls interactions between apps and the ecommerce panel 287. In a non-limiting example a user may book a ticket for an event using a booking app such as via interaction with touch panel 127 over display 126. The ecommerce panel preferably displays the payment due for the ticket. Payment for the ticket is effected by placing the user device 212 over the ecommerce panel 287, making use of the ewallet functionality in the user device 212. Alternatively a credit card or other payment means is used via a scanner in panel 287.

In operation, hardware 280 such as sensors 284 and camera system 289 gather data about the environment surrounding beacon 206. The gathered data is sent via network 208 to backend 250 where it is analyzed and where decisions are made regarding operation of beacons 206. In the opposite direction, decisions about beacon operation are taken by the backend 250 and transmitted to the beacons 206.

HiCMS backend 250 preferably enables scheduling of content for display across beacon groups 202 using upper displays 282 and lower displays 285 as well as connectivity/interactivity Subsystem 289. Various triggers may be used by backend 250 to program content including but not limited to time of day, geographic location of each beacon 206, proximity of a user, weather conditions, and audience data such gender, age, or size of audience. The schedule and content are sent to HiCMS frontend 262 which controls the display of content on the beacon 206 according to the instructions received and provides proof of play back to the HiCMS backend 250.

Content chosen for display might optionally be provided by information services 218, such as news or weather. Optionally, the content shown on displays 282 or 285 is related to the color of status light 110. For example, an emergency message on the displays will be accompanied by an amber colored status light. Alternatively the content displayed may be related to the "mood" of the environment as reflected on the displays and in the color of the lighting. Optionally content may be scheduled or may be "breakthrough content" such as an emergency announcement, Visual data collected from camera system 286 and provided by security and audience tracking system 264 is analyzed by backend 250 to provide eyeball tracking, gestures analysis and general audience analytics, to report back impressions on the content played, or identification of specific users (where allowed by users and taking into account privacy restrictions), user numbers or gender to dynamically adjust content and/or advertising provided to the beacons 206. Additionally camera system can collect other visual data such as car registration data. Visual data analysis is performed by OMS backend 250 based on techniques known in the art.

Additionally, backend 250 provides both real-time and post event processing and actions to deal with crowd control, security and surveillance. Preferably, content sent to beacons 206 for display may include news interrupts or emergency announcements including changes to color of lighting 281. As a non-limiting example, pressing of the emergency button such as button 132 will trigger the camera system 286 to record all activity around the beacon 206 while emergency services are dispatched by the backend 250 which also instructs the beacon 206 to change the color of the status light in lighting 286 to red. Backend 250 also keeps a status of a trouble ticket until the emergency is resolved and the ticket is closed. Backend 250 might optionally aggregate emergency data received from information services 218 in deciding how to respond to an emergency situation. Additionally, emergency messages may be relayed via the beacons 206 to user devices 212 via apps 214 installed on the devices 212.

Backend 250 may monitor environmental data across an area covered by multiple beacons 206 such as beacon group 202 by gathering environmental data from sensors 284 in each beacon 206 and mapping the levels across the area. Backend 250 might optionally include data provided by information services 218. Environmental information may be provided to customer 222 via portal 230.

Portal 230 preferably allows upload or definition of digital goods which are sold via beacons with payment made via ecommerce panel 287. Additionally, vendors can partner with customers to provide goods or services for sale via the beacons. Vendor data can be defined in portal 230 including payment gateways, iBeacon data and order fulfilment systems. Further, vendor location and operation data, including but not limited to store description, images, opening hours, and so forth, can be entered via portal 230. Such data is preferably displayed in local map data on the beacons 206 such as in the scenarios described with reference to FIGS. 4A-4H below. Payment data is transmitted to backend 250 and processed via payment gateway 216. The digital goods may be advertised such as on upper displays 282 for purchase via the ecommerce panel 287 of beacon 206.

In a further embodiment, beacons 206 can allow voting such as for a music contest. In such an application lower display 285 or app 214 may be used by the users for voting which is then transmitted to backend 210 for collection from the entire beacon group 202. The results can then be sent to the beacons 206 for display in real time such as on upper displays 282.

In a further embodiment, local devices such as device 213 may be in communication with beacon 206 to allow interaction with the device through beacon 206. In a non-limiting example, a user may access the beacon 206 to pay for parking at a parking meter in the vicinity of the beacon, where the parking meter is in communication with the beacon 206.

In a further embodiment, the beacon can reflect the "mood" of users in proximity of a beacon 206 or beacon group 202 by allowing users to vote for their mood via beacon 206 or via app 214. The collected mood votes are transmitted to backend 210 for processing and the color and/or intensity of lighting 281 such as the status light of the beacons 206 can then be changed to reflect the collective mood. Lighting management is further described with reference to FIGS. 6 and 7 below.

In a further embodiment, users can be challenged to reach a beacon 206, with prizes awarded for those that reach the beacon first. As the beacon 2016 is aware of the distance of each user from the beacon at the start of the race, this data can be taken into account.

In a further embodiment, the beacons 206 can be used as waypoints to guide vehicles in a city/urban area. Combined with license plate identification, the beacon network may be used to balance traffic and congestion in the managed area.

Figure 3:
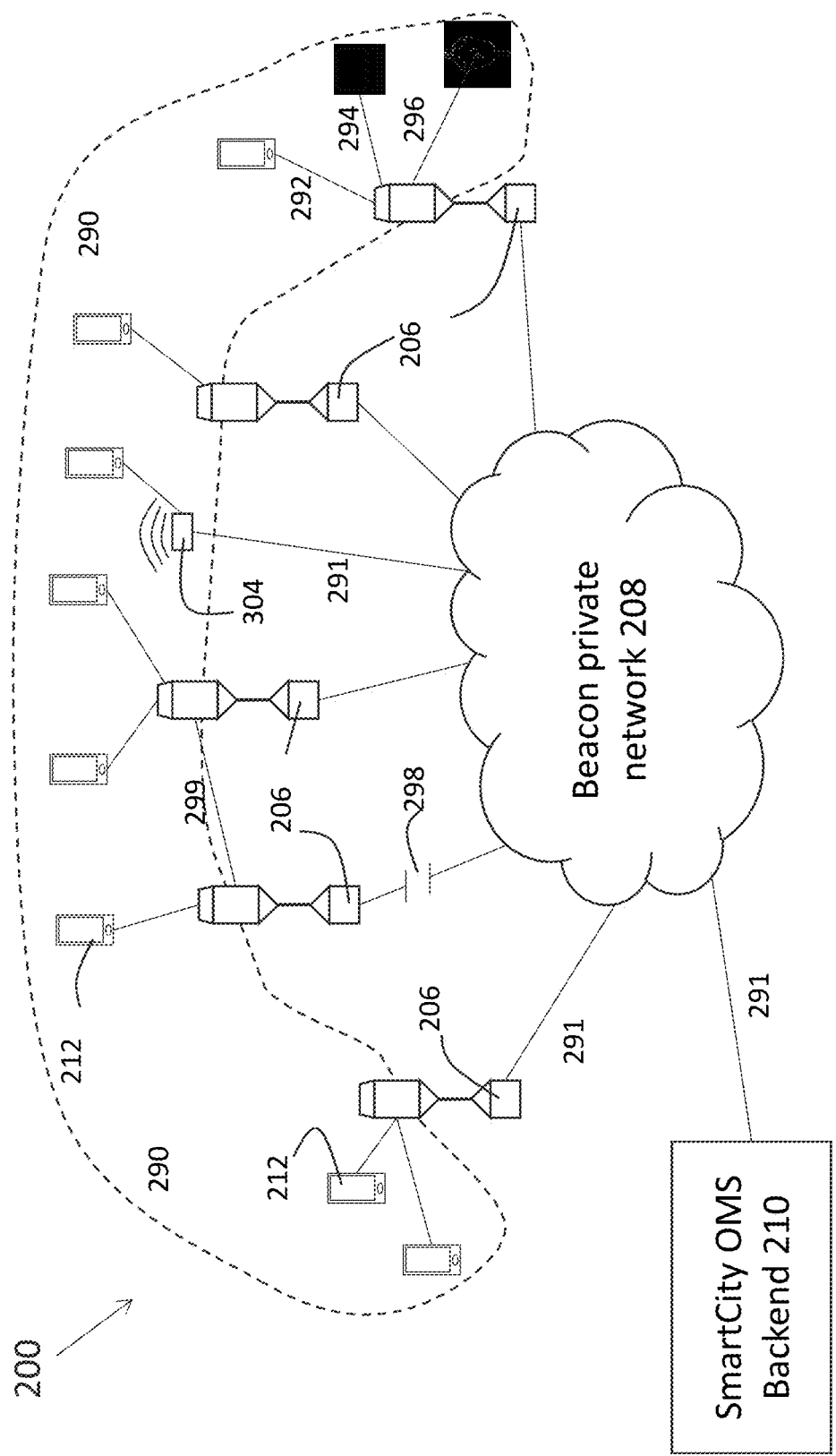
FIG. 3 is a schematic illustration of the communications and connectivity within the beacon system according to at least some embodiments of the present invention.

Reference is now made to FIG. 3 which is a schematic illustration of the communications and connectivity within the beacon system 200 according to at least some embodiments of the present invention. As shown, beacon system 200 is comprised of beacons 206, private network 208, OMS backend 210, and user devices 212. Beacons 206 and OMS backend 210 are connected to private network 208 via connections 291 that are preferably based on high speed broadband technology including but not limited to cable, DSL or fiber. Preferably, more than one broadband connection is provided to ensure redundancy. In cases where connection 291 is disrupted 298, a direct WiFi connection 299 is made to another beacon 206.

Devices 212 are preferably connected to beacons 206 via at least one of two methods:

WiFi connections where each beacon comprises long range WiFi antennas preferably providing connectivity up to 500 m. Optionally the WiFi range of each beacon is up to 1000 m. All beacons 206 share the same SSID thereby creating a WiFi mesh network 290 preferably covering the entire area populated by the beacons 206. WiFi mesh 290 thereby enables devices 212 to roam seamlessly between beacons 206 maintaining connectivity. Additionally the geolocation of devices 212 within the mesh may be calculated based on the signal strength of the device received at each beacon 206; and iBeacon based on Bluetooth preferably provides short range connectivity between beacon 206 and device 212. The range is preferably up to 15 meters. The connection to an ibeacon can be used to determine the device's physical location or trigger a location-based action on the device such as a check-in with the beacon 206. Interaction with the ibeacon requires the installation of app 214 on device 212. Each beacon 202 preferably broadcasts up to three ibeacon identifiers. The first is used by user devices 212 for short range connectivity such as connection 292 and activities related to the beacon 206. The second identifier is preferably used for connection to the beacon 206 by service personnel for maintenance or repair of the beacon 206 such as via connection 294. The third connection 296 may be used for similar purposes or may be used for any future purpose such as connection to nearby devices which may include parking meters or electric car charging stations so as to provide applications and functionality related to these devices. Optionally, more than three identifiers are provided.

Additionally and optionally, areas with no WiFi coverage provided by beacons 206 may be provided with supplemental coverage by WiFi hotspots 304 to increase the range of WiFi mesh 290. Hotspots 304 are connected to the beacon private network using connections 291 preferably based on high speed broadband technology including but not limited to cable, DSL or fiber as for beacons 206. Optionally, WIFI hotspots 304 share the same fiber infrastructure as beacons 206 or use wireless backhaul such as through direct WiFi connections 299 to beacons 206.

Optionally, other methods of connection may be provided.

Reference is now made to FIGS. 4A-4H which are flowcharts and related illustrative screenshots and embodiments illustrating interaction between the beacon system and a user with a mobile user device according to at least some embodiments of the current invention. In the illustrated interactions, an interactive application is provided on the user's mobile device. The mobile device then connects to one or both of the mesh network and the local ibeacon or Bluetooth network and the beacons report the connectivity to the OMS backend. The OMS then determines the proximity of the mobile device to the beacons based on the connectivity data, such as the calculated position within the coverage of the mesh WiFi, and optionally based on location information provided by the device. The proximity is then reported by the OMS backend to the application on the user device and/or display on the beacon and the behavior and content of the application as well as the beacon is adapted based on the reported proximity combined with gathered intelligence of user's preferences and settings. The OMS frontend and/or backend can communicate with the user device and make use of methods like mobile push notifications, app wakeup from background, or in-app content changes to adapt the functionality of the app, Users register with a device at a beacon or alternatively directly on the app. Registration may include voice authentication or optionally facial interpretation in accordance with local privacy rules and the consent of the user. Once registered, the user can be identified based on physical presence near any of the beacons through a token ID. The token ID is a unique hashed user identifier formed based on the above authentication methods. The token ID is stored on the mobile device to help identify users for use cases requiring security. Once registered the user may authenticate further activities on the beacon or the app including purchases using the token ID, facial interpretation or voice recognition optionally combined with other authentication methods such as NFC with the user device or other biometric sensors such as retina scanners or fingerprint scanners.

The following examples shows use of this interactive presence tracking to adapt the behavior of an app used by the user and also adapt the behavior of the beacon user interface. It should be appreciated that the steps in each of the scenarios below (FIGS. 4A-4H) may be interchangeable or may supplement another scenario. For example, the detection of a user app as in stage 1 of FIG. 4A, preferably takes place in all scenarios requiring beacon-app interaction (although it may not be described in each scenario).

Figure 4A:
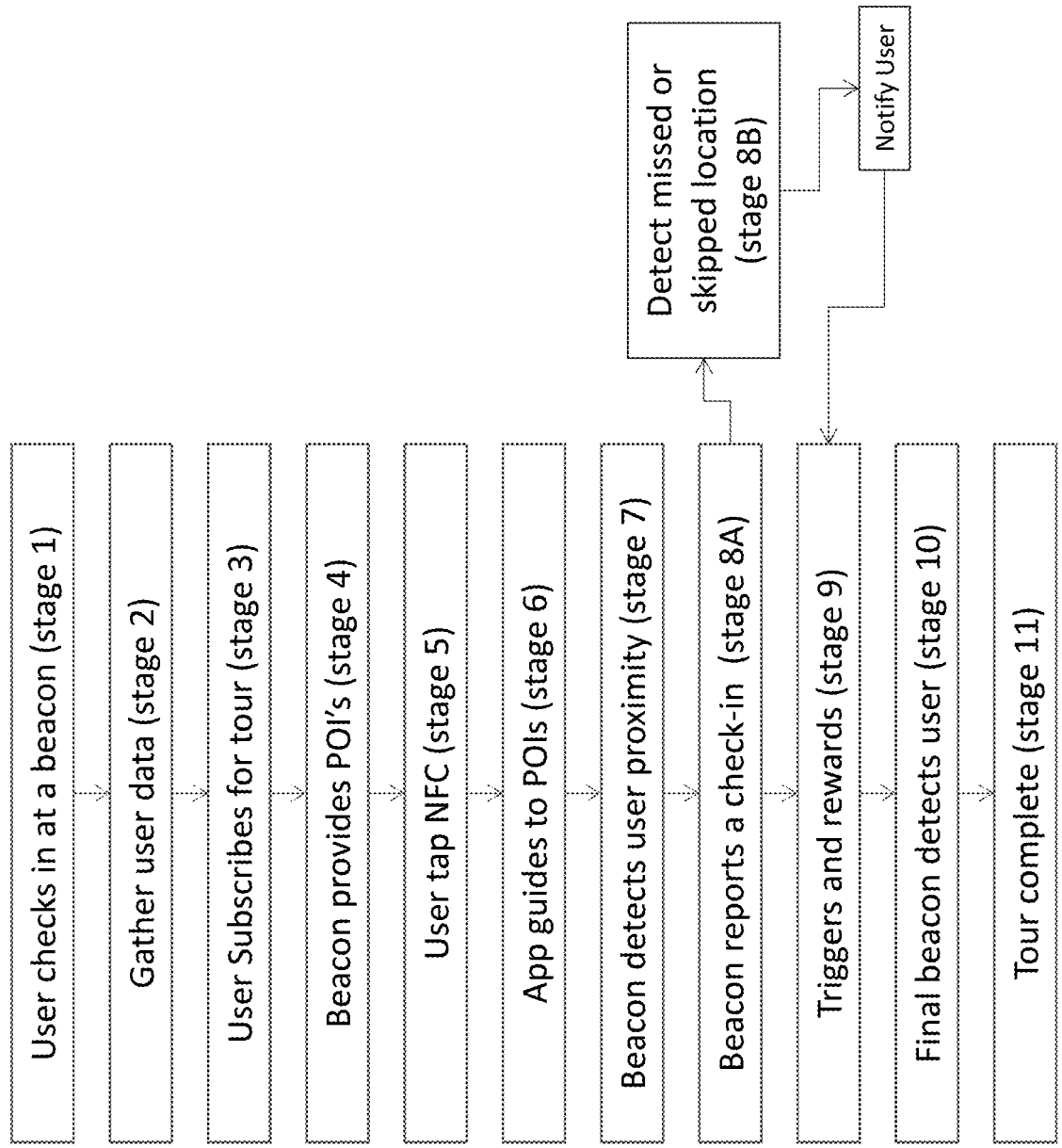
FIGS. 4A-4H are flowcharts and related illustrative screenshots and embodiments illustrating interaction between the beacon system and a user device according to at least some embodiments of the current invention.

With reference to FIG. 4A and as shown in stage 1, a user having a device with an installed beacon app (such as device 212 and app 214 as described with reference to FIG. 2A above), comes within range of the beacon, triggering a push notification on the user's phone or waking up of the app from background mode. The app asks the user to confirm the check in with the beacon or alerts the user that a check in or other action has been automatically responded to. In this example, the beacon is one of many beacons positioned throughout a city/urban area. The beacon detects the presence of beacon app on the user device using the ibeacon location capability but can optionally combine this with cellular, GPS and WIFI data and, in some cases, visual data from the cameras. In stage 2 the beacon gathers data about the user by actively requesting information via the lower display and also using methods including facial interpretation using the camera system and details about the user device gathered from the beacon app.

In stage 3 the user subscribes for a city tour by selecting this option from a tourist app that is installed on the beacon and presented via the lower display. Based on the location of the beacon and the type of tour chosen, the beacon indicates the points of interest (POIs) that will be covered by the tour in stage 4. The tour is planned such that it will bring the user into range of other beacons and the user is encouraged to approach these or check into them to unlock rewards.

In stage 5 the user downloads the POIs to the user device by placing it on or near the NFC (ecommerce) panel. Optionally, the user also pays for the tour via ewallet functionality of the device via the NFC panel. The beacon app that is on the user device now guides the user towards the POIs in stage 6. At each POI, and optionally along the way, the app provides information to the user about the significant sites and the POIs that are visited.

In stage 7, another beacon along the route of the user detects that the user is approaching using one or more of four methods: the ibeacon radio strength; facial interpretation which could be from the dome or lower cameras; based on the user's calculated position within the WiFi mesh network; and/or user interaction with the beacon such as via the touch screen on lower display.

In stage 8A, having detected that the user has come within the proximity of an expected beacon on the tour, the beacon reports a check in of the user and distributes this across the beacon network via the OMS backend so that all beacons are aware of the actual user's routing status. The app adjusts the tour route and the beacons can preempt actions when the user reaches the closest beacon—for example, the beacon may already display a reward screen as the user approaches. In stage 8B, a user is determined to have missed a check in or to have wandered from the tour path and in stage 8C the user is notified via the app and a recommended route is provided via the app to return the user to the tour route. In stage 9, the successful check in or approach to one of the beacons on the route triggers a reward for the user which is provided via the app on the user device.

In stage 10, the user completes the tour by visiting or approaching the final beacon on the tour path which detects the user using one the methods listed above. Once the tour is complete in stage 11, the user is offered several options by the app on the user device such as: providing an overview of tour including photos taken along the way; an option to save the overview and an option to share the tour overview via known sharing methods and networks; and/or leaving digital mementos such as a photo from the tour on the beacon for browsing by other users. Additionally, at stage 11, the data collected about the user and the user's tour is uploaded to the OMS backend for storage and analysis such as for marketing purposes or to improve the tour based on collected review of all similar tours taken.

Figure 4B:
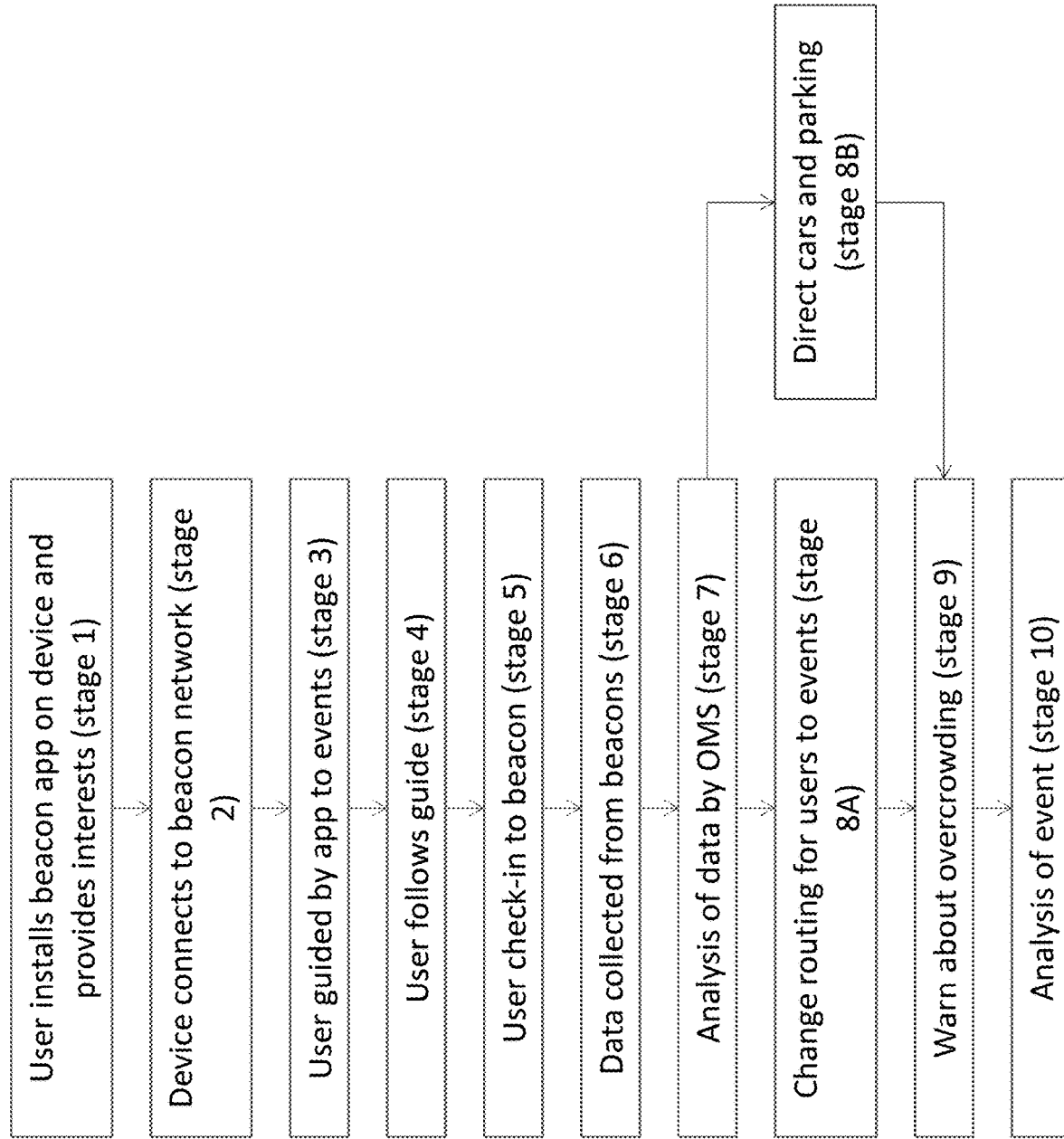

A further example of beacon/user interaction is presented with reference to FIG. 4B. In this example the OMS enables a customer—in this case a city—to inform and direct visitors/citizens (users) by influencing and measuring their behavior using beacons, the WiFi mesh and connected mobile devices. The example is based on a city-wide event which makes used of several locations in the city each of which is in the vicinity of a beacon. Different scheduled activities take place in three different locations in the city each with its own parking facility. Optionally beacons with automatic license plate scanning are positioned at city entrance roads.

In stage 1 users install the beacon app on their mobile devices and are prompted to provide their interests, in particular related to the event. In stage 2 mobile devices belonging to users connect to beacons via the WiFi mesh network. In stage 3 the app on the mobile device guides users to the locations of the event based on current time and date, transport and event timetables, the user's current location and the user's indication of interests in the event activities. The app further provides a recommended route and order of activity locations to user the user based on the same parameters.

In stage 4, the user starts to follow the proposed program. In stage 5 users optionally check-in at a beacon that is proximal to the event in order to receive rewards. These may be symbolic such as in-app badge, or may have value such as discount coupons.

In stage 6, data is collected from the beacons and the data is aggregated in the OMS backend. The collected data includes: the number of connections around each beacon and the population proximal to each beacon; the average dwell time of people at each location; the number of check-ins at locations; the unique identifiers of mobile devices or user profiles (if opted-in by the users); visual data collected by the beacon cameras and automatically analyzed to determine crowd numbers, gender split, and age estimations; the number of users choosing each activity; weather conditions and other gathered sensor data at each location; free/busy parking data provided from systems connected to each local beacon; and the traffic count at city entrance roads from beacons monitoring traffic on entry roads. Additional data is provided from external sources including: the maximum capacity at each locations; the distance between locations; and public transport timetables.

In stage 7, the gathered information is correlated and analyzed to determine the level of activity at each location. In stage 8a, the analysis is used to dynamically advise different routing instructions to different users via the beacon apps in order to balance the amount of users between events, locations and routes.

In stage 8b based on data gathered from beacons placed at city entrance roads and busy/free parking spot data from the 3 locations, beacon app users are directed to the locations in such a way as to balance the road and parking usage. Alternatively, users are advised, via the beacon app, to take public transport to the locations to reduce traffic and parking congestion. Optionally, the beacons may be used as waypoints to guide cars or other vehicles.

In optional stage 9, where the number of visitors exceeds the maximum allowed capacity at a location, the OMS backend provides an indication of this via the beacon. The indication may comprise changing the color of the status light and providing warning announcements on the beacon displays. Additionally, the beacon apps also provide this feedback to users.

In stage 10, data gathered throughout the event by the beacons is provided to the OMS backend for analysis, such as for learning about changes to be made for management of upcoming events.

Figure 4C:
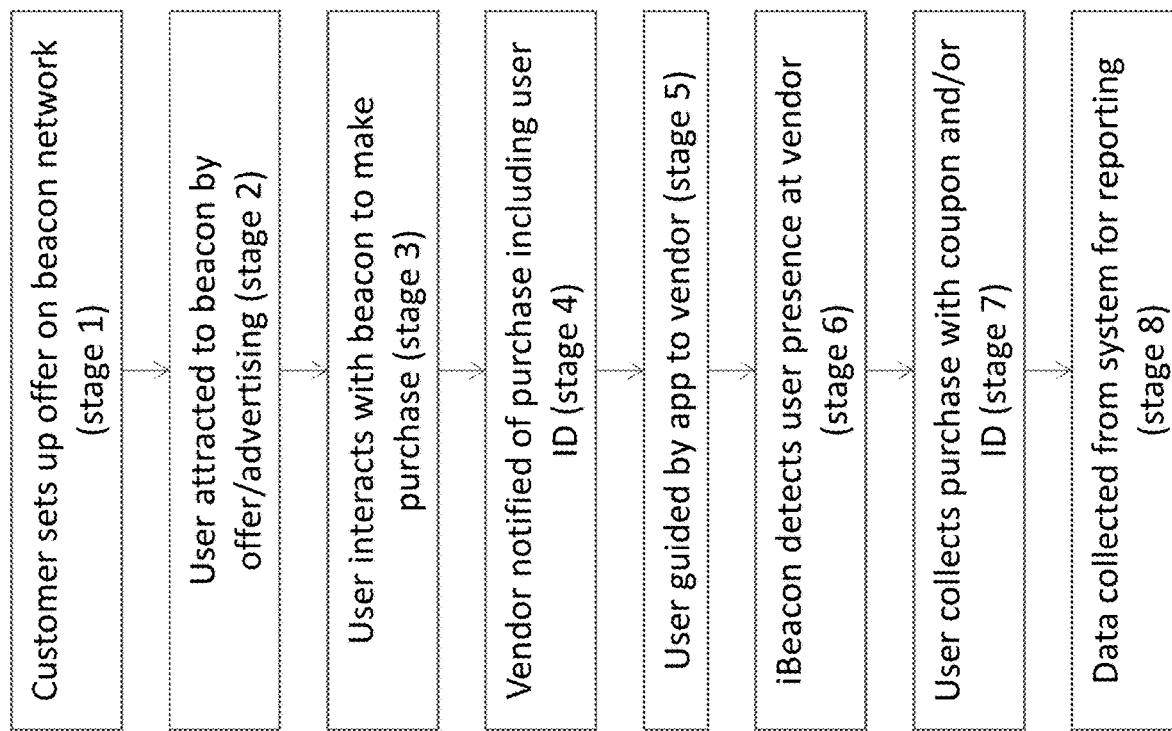

Reference is now made to FIG. 4C which is a flowchart illustrating purchase of at least one item or service from a beacon according to at least some embodiments of the current invention. A non-limiting example of the use of such a system provides for displaying a movie trailer on the beacon's upper screen in combination with a buy-one-get-one-free ticket promotion provided by a partnering cinema. Users could purchase tickets via the lower touch screen with their mobile-payments-enabled smartphone, and have a reminder and directions to cinema sent to their device. Once they arrive at the cinema, an iBeacon registers their presence and triggers welcome messages with further promotions for products they might be interested in.

In a further non-limiting example, a fast food restaurant advertises on the beacon's upper screen. Users could order from a menu app on the lower touch screen with their mobile-payments-enabled smartphone, and have a purchase coupon and directions to the restaurant sent to their device. Once they arrive at the restaurant, an iBeacon registers their presence and alerts staff to provide them with the ordered food.

In stage 1, the customer sets up an offer of an item for sale on the beacon network. This optionally involves an agreement with a vendor to sell the vendor product or service. This agreement typically includes advertising provided by the customer for the product using the beacon displays. The payment systems of the customer and the vendor as well as the order fulfilment systems of the vendor are interconnected to allow payment and order fulfilment. Optionally, the vendor provides an app for installation on the beacons that can be used as part of the ordering process.

In stage 2, such an advertisement or offer is displayed on the displays of the beacon to attract users to the beacons. In stage 3, a user interacts with a beacon such as through the lower touch panel and selects the item for sale. As above, this might be a specific item, or may be a menu of items to be chosen from, or may be a service or menu of services. Non-limiting examples include souvenirs, parking, restaurant menus, movie or event tickets, or municipal payments. The user then completes the purchase, preferably using NFC or other contactless payment via the commerce panel of the beacon. Alternatively, credit card or other payment method is used. Alternatively the users' mobile device can be used for authentication by pushing the transaction to a mobile payment app.

In stage 4 following processing of the payment, the vendor is notified of the purchase via the vendor order fulfillment system. A unique user ID of the purchaser is provided to the vendor to allow identification of the user by the vendor to allow the user to claim the purchased item. Optionally the user enters some form an ID as part of the purchase process. Optionally the ID is based on a photo of the user taken by the beacon cameras during the purchase process with the user consent.

In stage 5 the beacon provides a proof of purchase such as a digital coupon or code that is transferred to the beacon app on the user mobile device. Optionally, an indication is also provided about the readiness of the purchased item. For example, a food order from a restaurant might require some time for preparation and the expected time till the preparation is complete will now be indicated to the user. The user is also provided with a map/directions for reaching the vendor from the point of purchase (the beacon). These are transferred to the user device using the NFC panel of the beacon or other wireless means. The map and directions are preferably shown to the user in the beacon app on the user mobile device. Optionally, a native mapping app on the user device is used. The user then follows the directions to the vendor.

In stage 6 the user reaches the vendor. The arrival of the user is preferably detected based on an iBeacon installed at the vendor premises. Upon detection by the app on the user device of the iBeacon of the vendor, the app notifies the beacon management backend which in turn notifies the vendor order fulfilment system that the user has arrived at the vendor. For example, a user entering a restaurant could be notified by staff that their food order was ready as the staff are notified of their arrival. Optionally the visual ID such as a photo captured by the beacon can assist identification of the user arriving at the vendor. Alternatively the user makes their presence known to the vendor or approaches an automated purchase fulfilment device to complete the purchase. For example, at a cinema complex a user might utilize a ticketing machine to print the movie tickets that were ordered from the beacon.

Figure 4D:
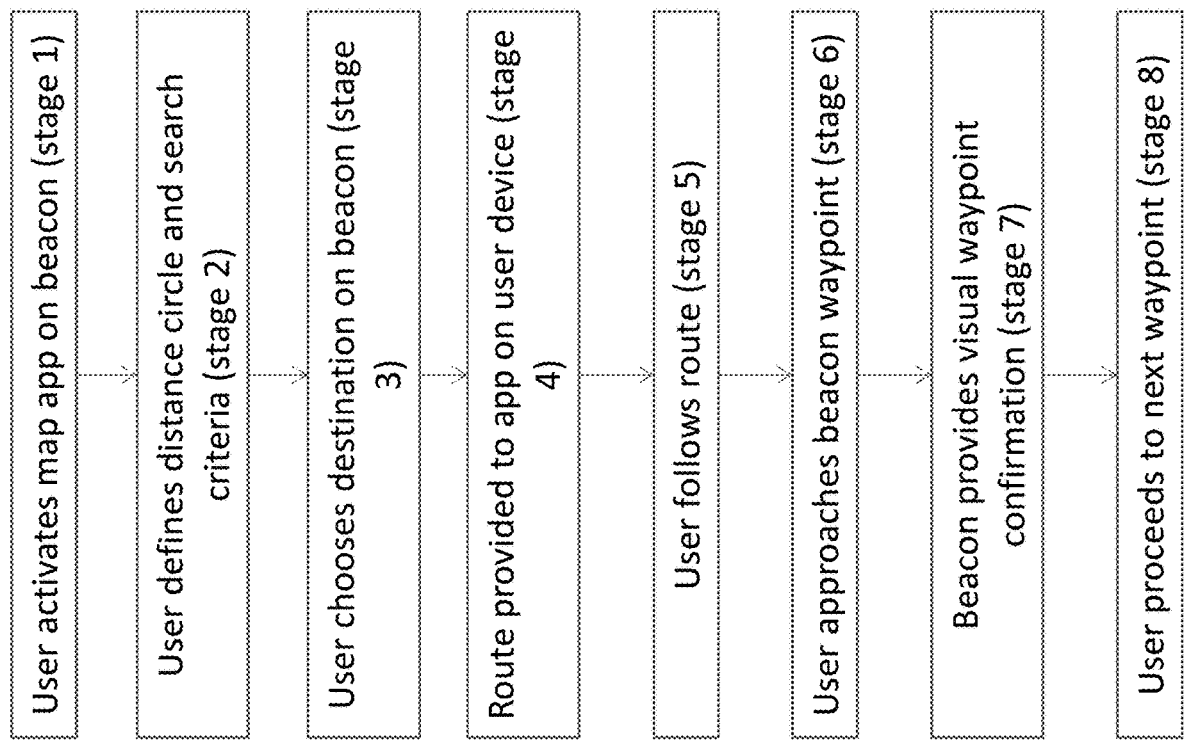
Figure 4E:
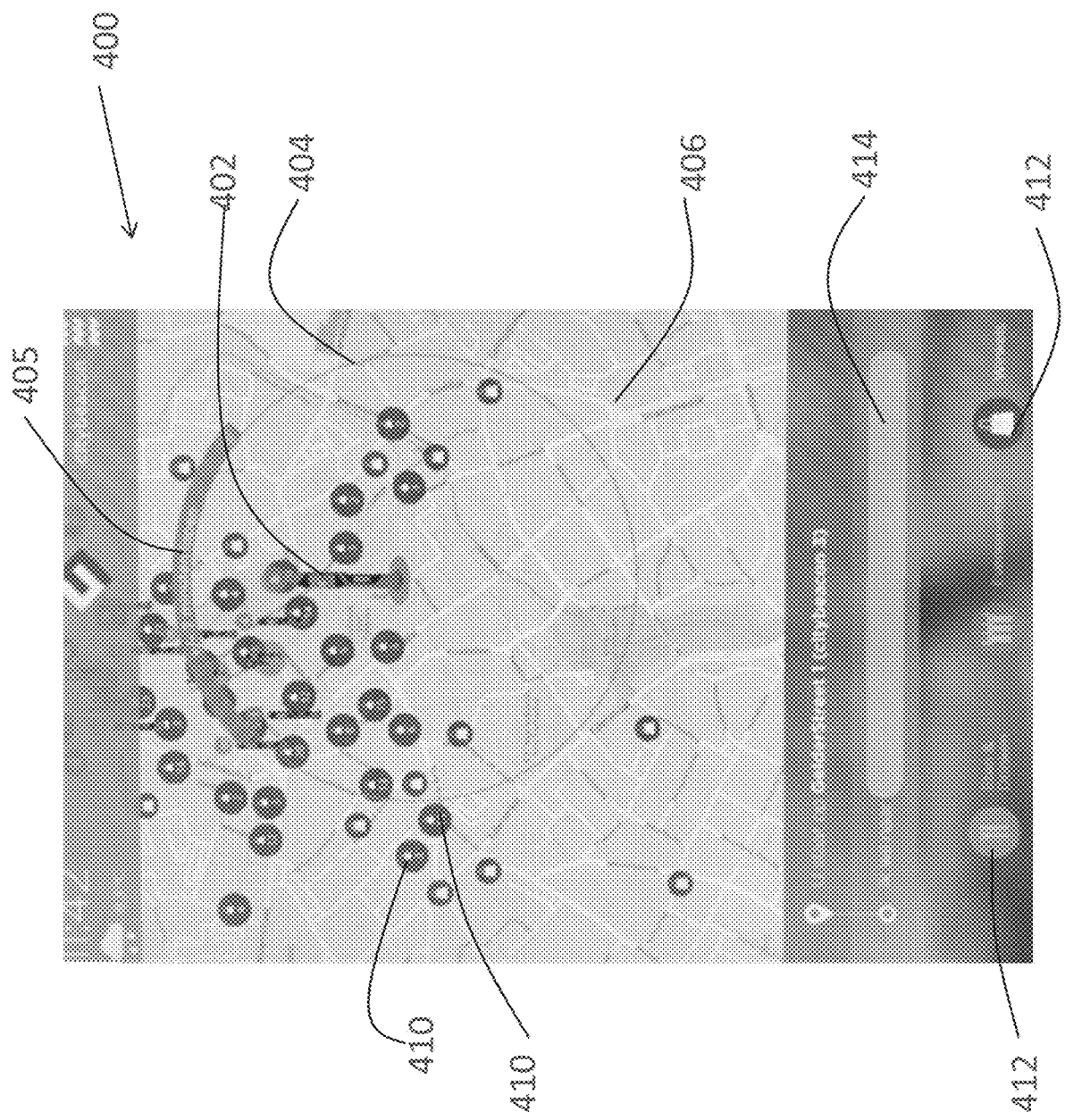
Figure 4F:
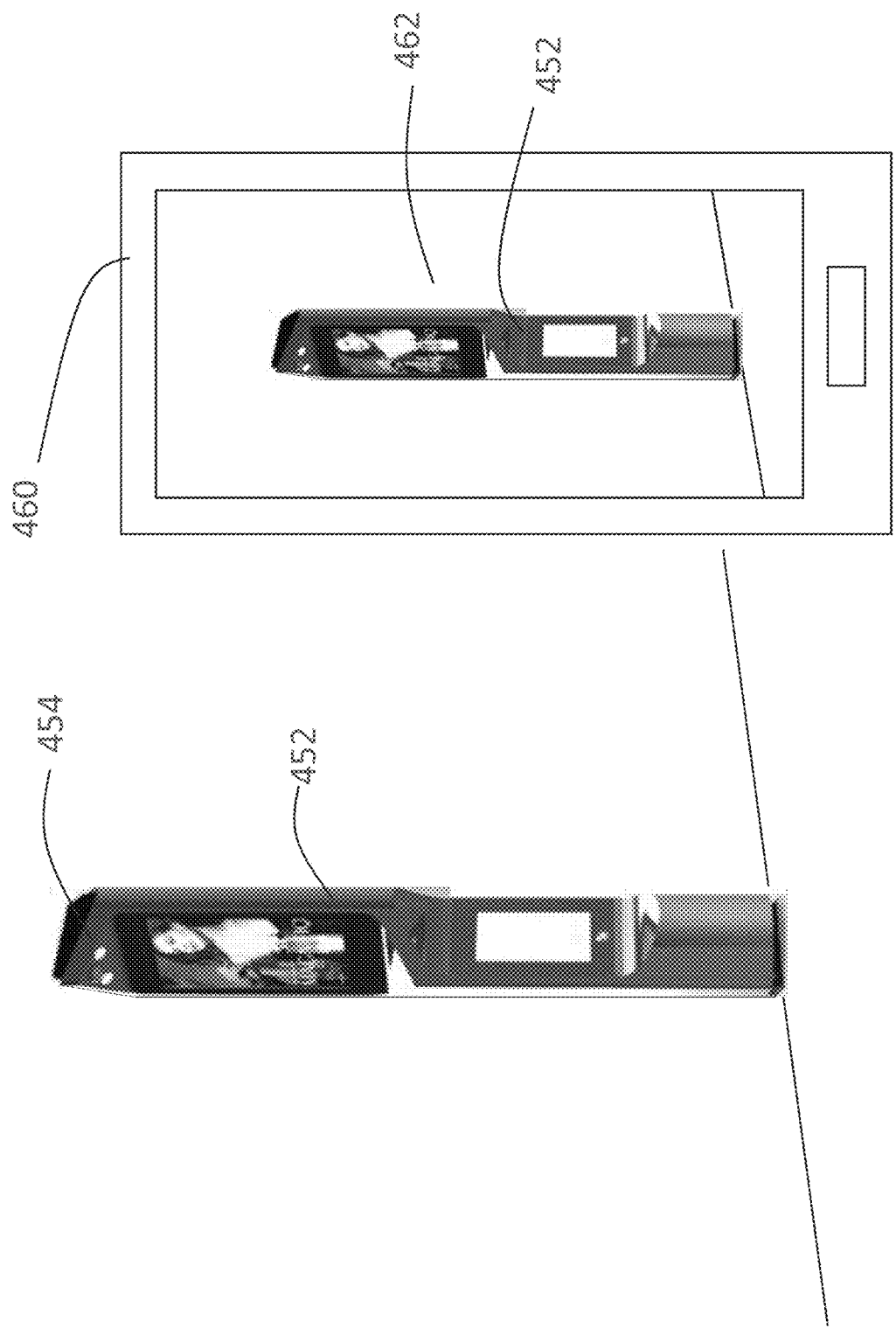

In stage 7 the user collects the purchased item optionally by scanning or otherwise providing the digital coupon on their mobile device to staff or to an automated purchase fulfilment device. In stage 8, the successful purchase and any related details are recorded by the beacon backend system and may be used for analytical purposes. Reference is now made to FIGS. 4D-4F which are a flowchart illustrating use of a mapping and wayfinding application and related exemplary screens and display options on a beacon according to at least some embodiments of the current invention. In stage 1 a user activates a map app on the beacon. This is preferably done via interaction with the touch screen of the beacon. An illustrative screen 400 is shown in FIG. 4E.

As shown in FIG. 4E, the beacon 402 where the user is currently located is depicted on the map 406. A distance circle 404 is also shown on the map. The distance circle can be expanded or reduced in size by the user and includes an indication 405 of the extent in time or distance of the circle. In the non-limiting screen 400, the circle 404 represents a walking distance of approximately 7 minutes as indicated 405. A user may also define map search criteria using softbuttons 412. As non-limiting examples, a user can choose to display all shops or restaurants or tourist points of interest on the map by selecting related button 412. Once a criterion is selected, related points of interest 410 are shown on map. The user can then get further information about each point of interest (POI) 410 by selecting (not shown) the POI 410. The user can also quickly determine which of the POI 410 are within the distance circle 404 that the user has chosen. Optionally the user may search for particular POI using the search box 414.

In stage 2 the user chooses the distance circle and the search criteria and then reviews the relevant POIs. In stage 3 the user chooses the destination on the beacon map interface. Route options are then prepared with directions form the beacon to the chosen destination. Route options can include different modes of transport including walking, cycling, vehicular or public transport. In stage 4 these route options are transferred to the user mobile device. The transfer is via the NFC panel of the beacon but my optionally be via any other wireless means.

In stage 5 the user follows the route and directions as shown on the mobile device. These are preferably shown in the beacon app on the device but may optionally be shown on any map app on the device. The user's current position is provided by GPS functionality of the device or optionally based on the signal strength of the mesh WiFi provided by the beacon network. If the route includes a beacon as a waypoint then in stage 6 the user will approach the beacon waypoint.

In stage 7 the waypoint beacon will provide some form of indication to the user that they have reached or are approaching the correct waypoint beacon. Optional methods of indication are illustrated in FIG. 4F. As shown in FIG. 4F a beacon 452 activates its status light 454 as the user approaches. Alternatively the beacon 452 can provide any other indication that the user is looking at the correct beacon by making use of any of its displays, speakers or other lighting systems. The beacon is made aware of the user's approach when the beacon app on the user device sends an indication of the approach to the beacon network backend which then alerts the beacon and initiates the visual indication.

Alternatively an indication can be provided on the device of the user using augmented reality. As shown in FIG. 4F a user device 460 is held such that the device camera includes the waypoint beacon 452 in its field of view. Using image processing techniques as known in the art, the beacon 452 is detected and segmented on the image shown on the user device 460. Following determination by the beacon app on the device that the viewed beacon 452 is in fact the waypoint beacon, the image 462 of the beacon will be augmented with an indication that this is the waypoint beacon 452. The indication may be a glow 462 around the image of beacon 452 as shown in FIG. 4F but optionally any other means of indication could be used.

Having received a visual confirmation as in FIG. 4F, the user then proceeds to the next waypoint as at stage 8 and continues till the route destination.

Figure 4G:
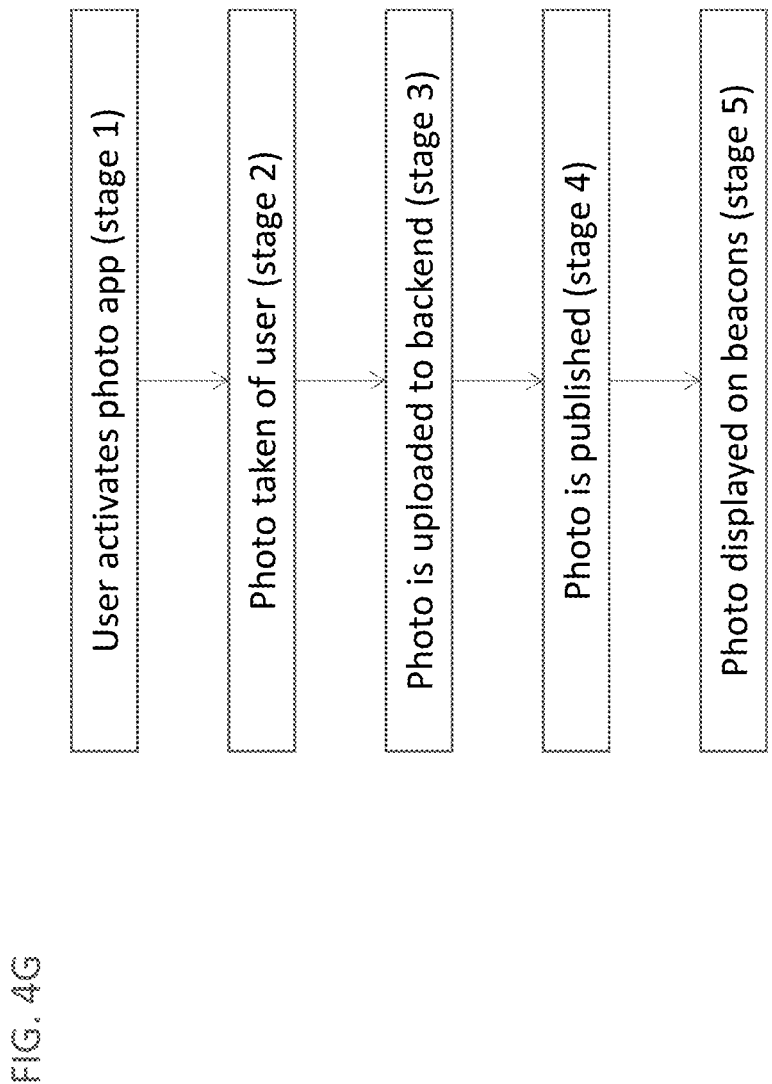
Figure 4H:
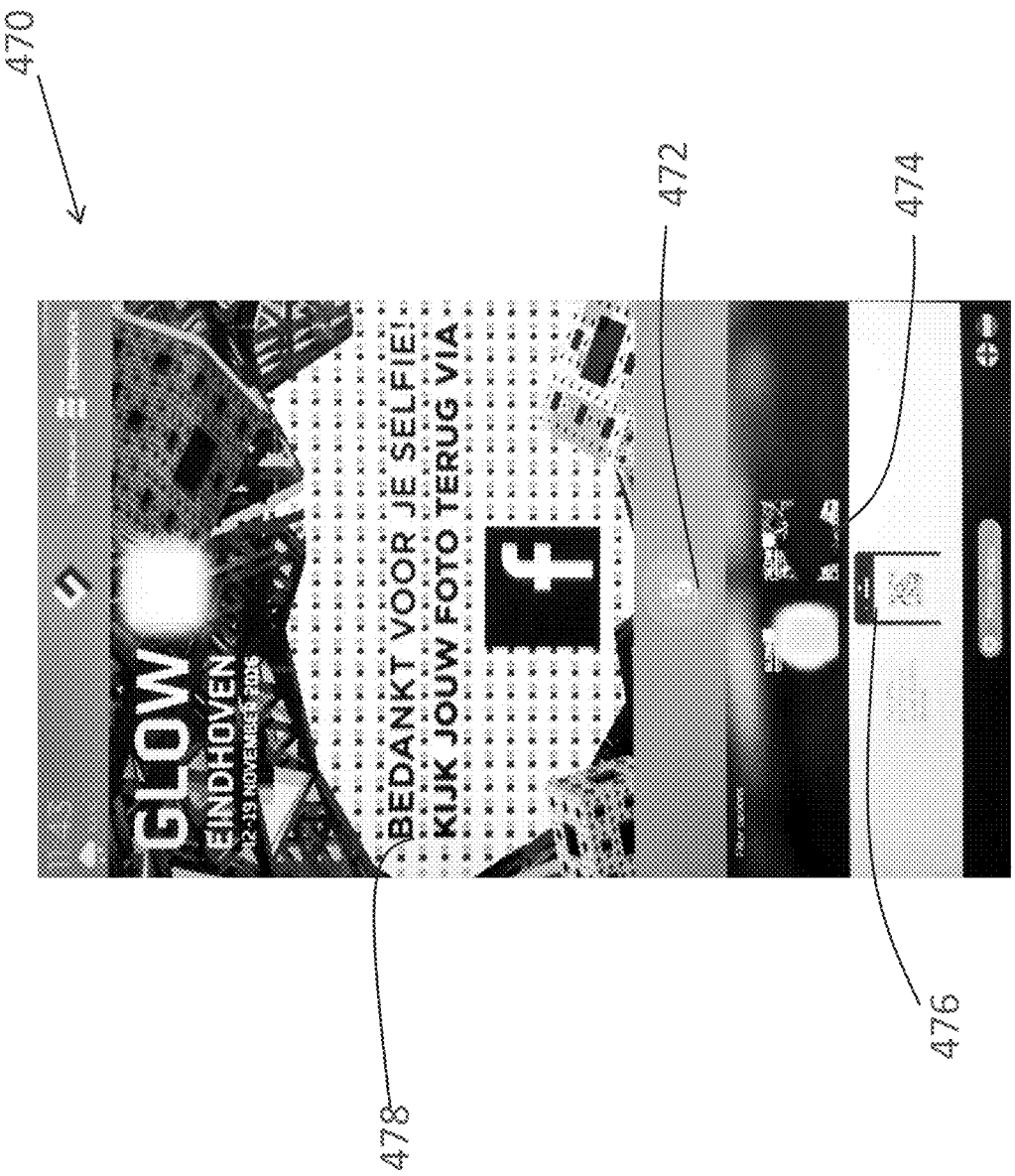

Reference is now made to FIG. 4G which is a flowchart illustrating use of a photo application and FIG. 4H which is an exemplary screenshot of a photo application on a beacon according to at least some embodiments of the current invention. In stage 1 a user activates a photo app on the beacon. This is preferably done via interaction with the touch screen of the beacon. In stage 2 the lower cameras of the beacon capture an image of the user (or group of users) standing in front of the beacon. As shown in FIG. 4H of exemplary photo app screen 470, the captured image is displayed in area 478.

The user presses on the capture/photo button which may use the beacon physical buttons or may be an on-screen button such as button 472, and, optionally after a countdown, the photo is taken. The user is then given options for enhancing the photo including but not limited to image enhancements and corrections, addition of backgrounds—such as background options 474, addition of icons, and so forth. The user optionally also consents, such as by an on-screen checkbox (not shown), to allow display of the photo on beacon displays or to be shared for promotional purposes.

The user then clicks on a save/upload button (for example on the touch screen interface—not shown) and in stage 3 the photo is uploaded to the beacon backend. In stage 4 the photo is published and the user is provided with a link, such as code 476, to download the photo or to share the photo online. Optionally, image analysis may be performed on the image to derive anonymous statistics or information including but not limited to the number of participants in a photo, the gender, and so forth.

In stage 5, preferably as part of a promotional campaign, and optionally following moderation, the user photo is shown on the displays of the beacon where the photo was taken and preferably also on select displays of other beacons in the beacon urban area and/or optionally also via social media channels.

Figure 5:
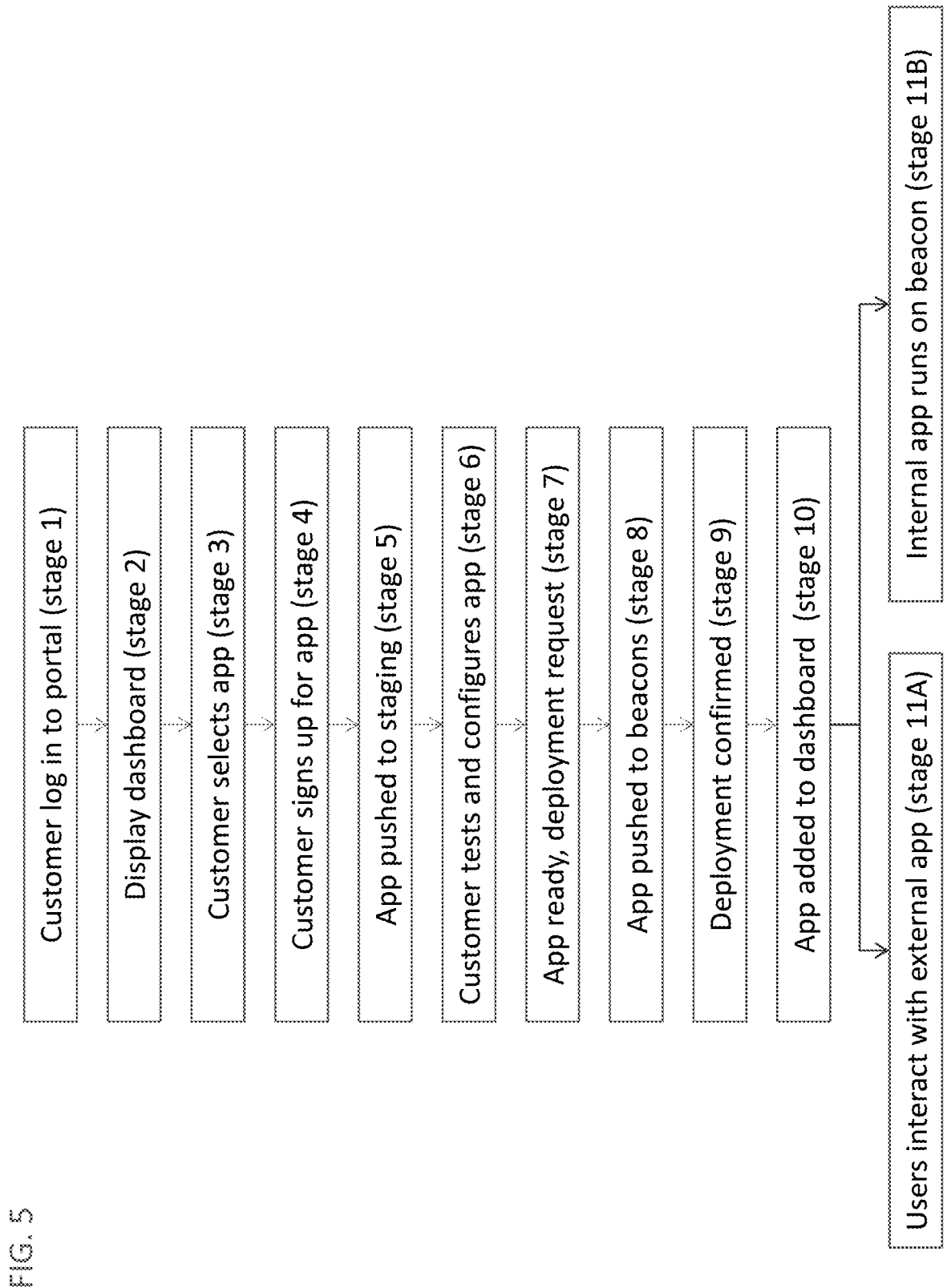
FIG. 5 is a flowchart illustrating the choice by a customer of an app for deployment on a beacon group according to at least some embodiments of the current invention.

Reference is now made to FIG. 5 which is a flowchart illustrating the choice by a customer of an app for deployment on a beacon group according to at least some embodiments of the current invention. As shown, in stage 1, the customer logs into the SmartCity portal. In stage 2 the OMS retrieves contract details and customer personnel information as well as details about the beacon network rented by the customer. These details might include the number of beacons deployed and active, capabilities of the beacons, and languages currently supported.

In stage 3 the customer is shown the available library of internal and external apps for deployment on the beacons and the customer selects an appropriate app for deployment. Non-limiting examples of apps include: an interactive map of the urban area, a marketing app providing audience information as well as advertising management tools to match advertising and promotions to beacon audiences, a parking application for payment for parking nearby to beacons; and a bike rental app for rental and payment of bicycles in the urban area. Apps utilize APIs to access beacon functionality such as screen interactions and/or the NFC payment interface. In stage 4 the customer signs up for deployment of an app and the OMS concludes the transaction including payment, contract updates and related items with the app provider and the beacon owner.

In stage 5 the OMS pushes the app to a staging environment for further testing, configuration and localization of app behavior and content by the customer in stage 6. Configuration includes definition of payment gateways for transfer of payments made in the app to the customer and/or beacon owner and/or app provider. In stage 7, the customer approves the app for deployment and in stage 8 the app is pushed to the relevant beacons where it either functions internally or externally in which case it is visible to users of the beacon via the display. In stage 9 the deployment is confirmed by the OMS and in stage 10 the app is added to the provisioning and reporting dashboards within the portal enabling the customer to make changes to the functionality of the app and/or to access report about the information gathered by the app or any other data related to the app.

In stage 11A, for external applications, users interact with the application via the beacon. Interaction preferably includes use of beacon functionality such as touch interface, displays, cameras, and payment panels. Alternatively in stage 11B, for internal applications, the app preferably functions as intended, gathering data such as environmental or crowd data, or managing aspects of beacon functionality such as rotation of advertisements.

Figure 6A:
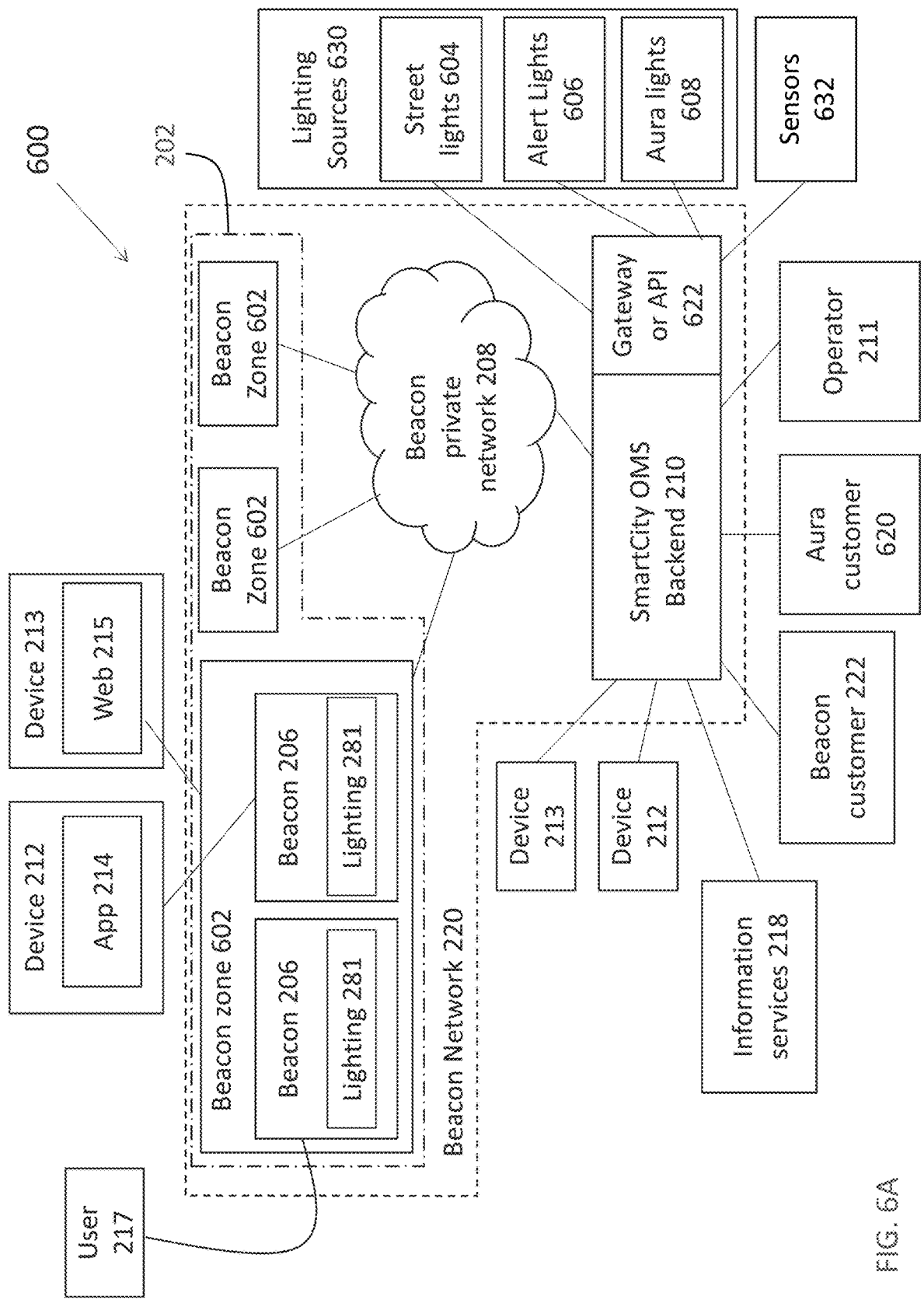
FIG. 6A is a schematic block diagram showing a system for operation and management of an urban color lighting network according to at least some embodiments of the present invention.

Reference is now made to FIG. 6A which is a schematic block diagram showing a system for operation and management of an urban color lighting network according to at least some embodiments of the present invention.

The urban color lighting network or "City Aura" as it may be referred to herein, provides for manipulation of lighting in an urban area. Non-limiting examples of such an area include a city, town, shopping mall, university campus, property campus, airport or other geographic area or campus. The lighting that is manipulated may be part of a beacon network as described above, or the street lighting, or alert lighting, or lighting structures erected specifically for the purpose of providing a managed urban lighting network. The lighting may be manipulated to reflect the "mood" of the area as described further below. Alternatively specific colors, patterns of colors, and/or lighting intensities may be applied for messaging, advertising, or emergency purposes.

As shown in FIG. 6A, lighting network 600 comprises a beacon network 220 connected to external entities, devices and systems. System 600 is similar to or may be an extension of the network described above with reference to FIGS. 2A-2C above with modifications and additions as described below.

Lighting network 600 is managed by beacon customer 222 or alternatively by city aura customer 620 via OMS backend 210. A city aura customer 620 preferably only manages the lighting in network 600 and does not manage other functionality related to the beacon network or beacons such as that described above. In both cases the customer manages lighting covering the urban area as described above with non-limiting examples as provided.

Beacon 206 comprises lighting 281 as described above which comprises the beacon status light and also street and local lighting. Lighting 281 may use any light generating technology but preferably includes colored lighting capabilities. Optionally, beacon displays 282 and 285 may be used for lighting purposes and may be included in the network 600.

In addition to the lighting that forms part of the beacon 206, other forms of lighting may be part of the lighting network. These additional lighting sources 630 include:

Street lights 604 which may optionally comprise any number of or the entire street and/or pedestrian area lights that are part of the urban area managed by customer 222 or 620;

Alert lights 606 comprise any lights in the managed urban area provided for alerting the population of the area. Non-limiting examples of alerts and associated colors may include some form of emergency situation (red), high pollution, dust or pollen air levels (yellow), or all-clear indications (green). Preferably alert lights 606 can be repurposed for mood or other lighting when not needed for alert purposes;

Aura lights 608 provide an indication of the collective mood of the urban area determined as described below. Aura lights 608 may include lighting specifically installed as part of the Aura network 600 or may optionally include any other connected lighting source including display panels. Optionally, Aura lights 608, may comprise mobile lighting sources including but not limited to floodlights, moveable displays, a road-going vehicle, or airborne vehicle such as a helicopter, blimp, or drone.

Lighting sources 630 such as street lights 604, alert lights 606, and Aura lights 608 may use any light generating technology but preferably includes colored lighting capabilities. Optionally, lighting sources 630 comprises displays and arrays of displays such as those used for digital signage, TV or computers. All lighting 281 and 630 preferably includes variable intensity capabilities.

Beacon groups are further subdivided into beacon zones such as zone 602 for the purposes of management of the lighting of beacons in each zone. Zones may optionally be geographic areas but could be any group of beacons that are suited to be grouped together for the purposes of lighting management. Lighting sources 630 are also preferably divided into zones to allow management per zone. Beacon zones are defined in backend 210 and these can optionally include lighting sources 630.

Beacon sensors 284 (FIG. 2C) preferably include light intensity sensors for detection of the lighting conditions around each beacon 206 or beacon zone 602. Cameras 286 also provide data about ambient brightness around each beacon as well as other factors that can be used such as presence of people, crowd level data or crowd mood such as via smile detection. For other lighting sources 630, either existing or additional sensors 632 provide for detection of the lighting conditions around each light source. Sensors 632 can also include cameras for providing camera data as described above. Optionally, beacon sensors 284 can be used to determine lighting conditions for lighting 630 that is part of the same geographical area or zone 602.

Sensors 284 and 632 can indicate to backend 210 whether it is light or dark in the area surrounding the light source (281 and/or 630) including any level of light in between such as dusk or overcast conditions. The same information and additional information such as crowd density can also be provided by beacon cameras 286 or cameras that are part of sensors 632. This information can in turn be used to set the lighting intensity of the light sources 281 and/or 630, for example to reduce or increase light intensity to match the lighting conditions surrounding the light source 281 and/or 630. Light intensity may also preferably be adjusted to save electricity such as when sensors 632 or cameras 286 determine that there are no people in the vicinity of the light source.

Optionally, an assessment of the lighting condition per zone 602 can be made to adjust lighting per zone based on the feedback from the sensors 284 and/or 632.

Lighting is controlled by server-based backend 210. Backend 210 communicates with beacons via private network 208 as described above. Communication with lighting sources 630 may optionally be via a gateway or API 622. Gateway 622 preferably supports lighting control standards as known in the art including but not limited to Digital Addressable Lighting Interface (DALI) including IEC 60929 and IEC 62386, 0-10 V, Digital Signal Interface (DSI), or any other current or future standard.

Sensors 284 and 632 provide feedback to backend 210.

As part of the city aura concept, users can help define the collective "mood" of the city which is then shown as a color using the lights that are part of the network. The mood is thus "crowdsourced" by allowing users to interact with the system 600 to define the appropriate color.

Users, such as user 217 interact directly with each beacon via, for example, the display 285, and preferably also using their own mobile devices 212 and 213 such as smartphones or similar computing devices as defined above running a suitable software application 214 (also referred to as an app 214) or using a Web browser 215. App 214 is preferably a dedicated software application. Web browser 215 accesses a webpage providing the same or similar information and functionality as app 214 within the limitations of the technology. App as used herein may refer to either the dedicated app or Web interface. Additionally, devices 212 and 213 may communicate directly with backend 210.

Figure 6C:
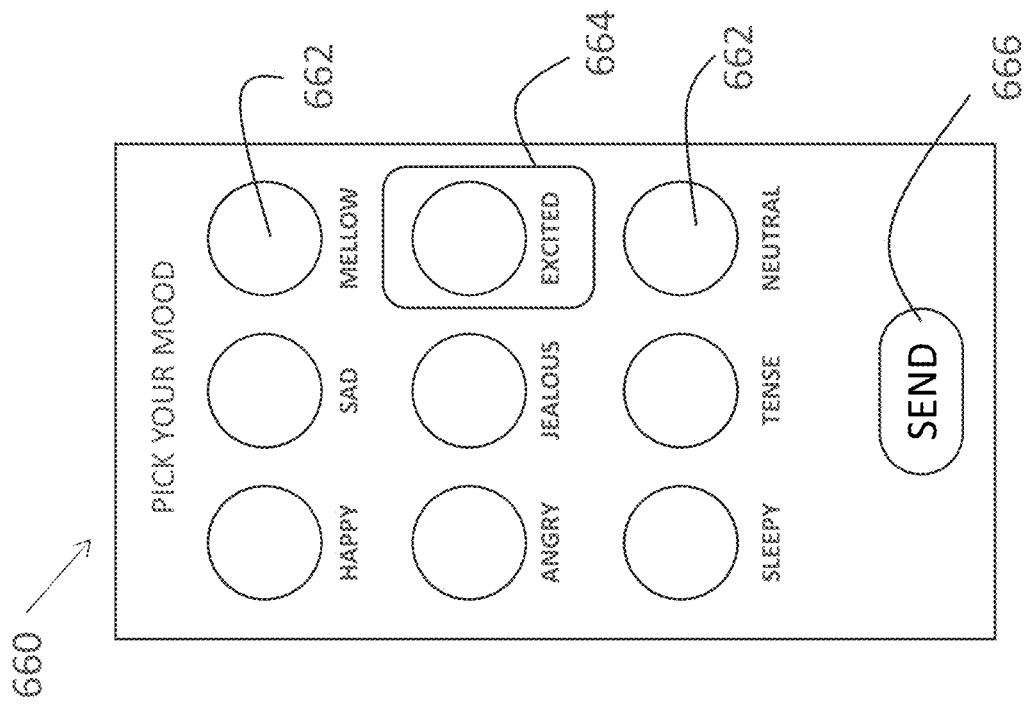
FIGS. 6B and 6C are exemplary user interface schematics allowing users to indicate their chosen mood according to at least some embodiments of the present invention.
Figure 6B:
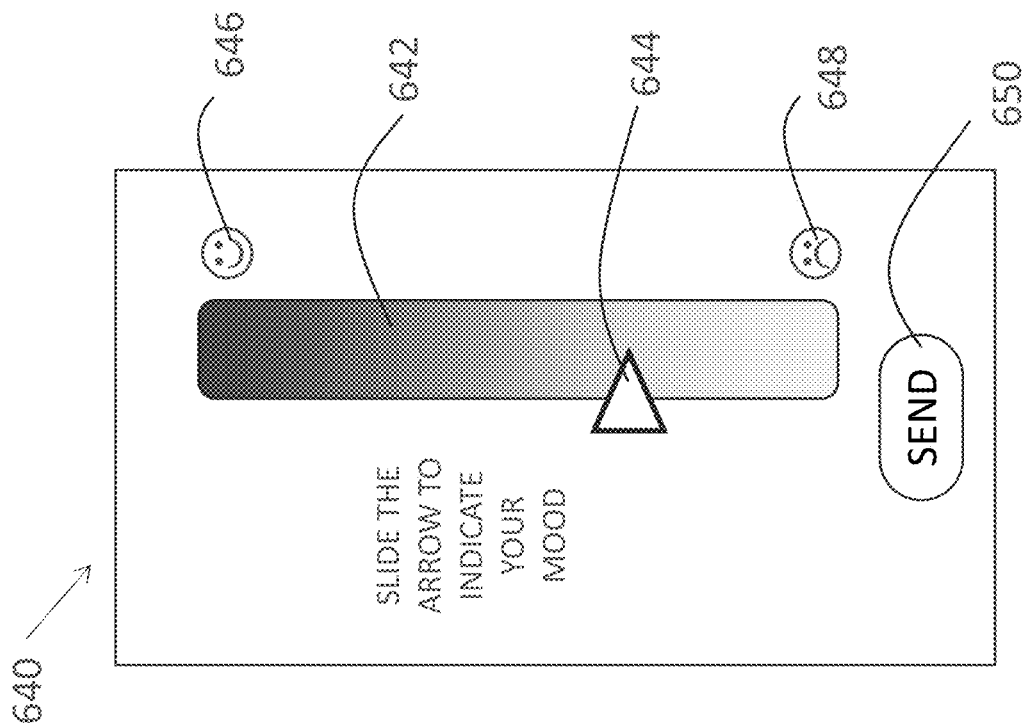

Reference is now made to FIGS. 6B and 6C which are exemplary user interface schematics allowing users to indicate their chosen mood according to at least some embodiments of the present invention.

User interaction to determine the mood color may be implemented in several ways. In a first non-limiting example of a user interface 640 to select the user mood as shown in FIG. 6B, a user is presented with a colored bar 642 showing a color gradient that covers the full visible light spectrum. Alternatively the color gradient reflects only the range of colors that the system 600 is capable of displaying. The user is then invited to slide an arrow 644 up or down the gradient bar 642 to select a color reflecting their mood. Optionally, suggestive icons 646 and 648 indicate the range of emotions reflected by the extreme ends at each end of the gradient bar 642. Once the user has selected a color and clicked the send button 650, the color choice is sent to the backend 210 for processing. The color choice is either sent via the beacons 206 or directly to the backend 210 depending on how user 217 is connected to the system 600.

In an alternative non-limiting example of a user interface 660 to select the user mood as shown in FIG. 6C, a user is presented with buttons 662 reflecting mood choices. These buttons are optionally colored or alternatively may not be colored. A selected button is indicted by a selection box 664 and clicking on the send button 666 sends the user choice to backend 210. The color choice is either sent via the beacons 206 or directly to the backend 210 depending on how user 217 is connected to the system 600.

FIGS. 6B and 6C are exemplary and non-limiting and many other interface choices could be made. The primary difference between the approaches of FIGS. 6B and 6C is that for FIG. 6B the color choice is made by the user whereas for FIG. 6C the user picks a mood which is translated by the backend 210 into a color based on a color/mood database that is present in backend 210. Alternatively a combination of these approaches may be made allowing a user to pick a mood which is associated with a color such as in FIG. 6C where the mood buttons have predefined colors. Optionally a portion of users may choose the one method and a portion another method.

OMS backend 210 collects the inputs from users and computes the appropriate mood color based on any of the average or median of all the colors and/or moods chosen by users based on the input method chosen as described with reference to FIGS. 6B and 6C.

Optionally, backend 210 collects other mood factors such as information or inputs that are used to adjust the mood color. Cameras 286 positioned in beacons 206 or as part of sensors 632 may detect facial expressions of users in the vicinity of beacons 206 and perform mood detection of the area based on the recognized expressions such as smile detection. Optionally, crowd level data as detected by cameras 286 or sensors 632 is used. Other information may be related to events taking place in the area where an event-related color would be used instead of the computed mood color. Alternatively, a news event might trigger a color not related to the calculated mood. Alternatively, an emergency event may trigger an override of the chosen color so that the lighting of network 600 is used to display an alert color. Data about events, news or alerts may optionally be provided by information services 218. Other exemplary non-limiting factors for calculating the city aura color could include weather conditions, public opinion about an issue, event or person, feedback or monitoring of social media, public or religious or commemorative days, or time of day, month, or year. Optionally, the aura color could be based on a campaign run by beacon customer 222 or an aura customer 620 to ask users choose a color based on a specific issue or event.

Preferably, the beacon customer 222 or an aura customer 620 chooses what algorithm to use and also the weighting of the various "mood factors", such as those listed above, used in the algorithm including which inputs are used at any given time.

Alternatively the beacon customer 222 or an aura customer 620 chooses a color based on a specific need. Non-limiting examples may include an event in the urban area or a beacon or lighting zone associated with a specific color, or a choice of a color for a specific day, choice of color for advertising purposes or testing of the system. Using portal 230 as described with reference to FIG. 2B customers 222 and/or 620 may access provisioning interface 232 to choose a lighting algorithm and/or color for any of the beacon network, lighting zone, lighting type (281, 604, 606, or 608), or any combination of these and any mix of colors and intensities of light within the capabilities of the system 600.

Customers 222 and 620 may also use provisioning interface 232 to change the colors associated with specific moods. Such a change will affect the color choices available to users 214 of beacons 206 and devices 212 and 213. Preferably, some colors may be reserved for specific use. A non-limiting example might include reserving of red or amber as emergency colors only. Customers 222 and 620 may also access reporting interface 234 to view the status of lighting in the lighting network 600 and also feedback from sensors 284 and 632.

Customers 222 and 620 may also use provisioning interface 232 to set energy saving characteristics of the lighting network 600. Non-limiting examples include defining times of day, optionally relative to sunrise and sunset, for increasing or decreasing lighting intensity, or reduced lighting intensity if no people are detected in the surroundings of the zone 602, beacon 206 or lighting source 630.

Once the color to be displayed in parts or all of lighting network 600 are chosen, backend 210 instructs the hardware associated with lighting 281, or 630 to display the chosen light color and/or intensity. Additionally the chosen color and optionally reasons for the chosen color are provided by backend 210 to a website, social media, app 214 or web app 215, or other broadcast means (not shown) to communicate the color choice to the population surrounding beacons 206 and lighting 630. Optionally, this reason/choice data is also provided on the beacon, app, or website accessed by users to choose the color.

Figure 6D:
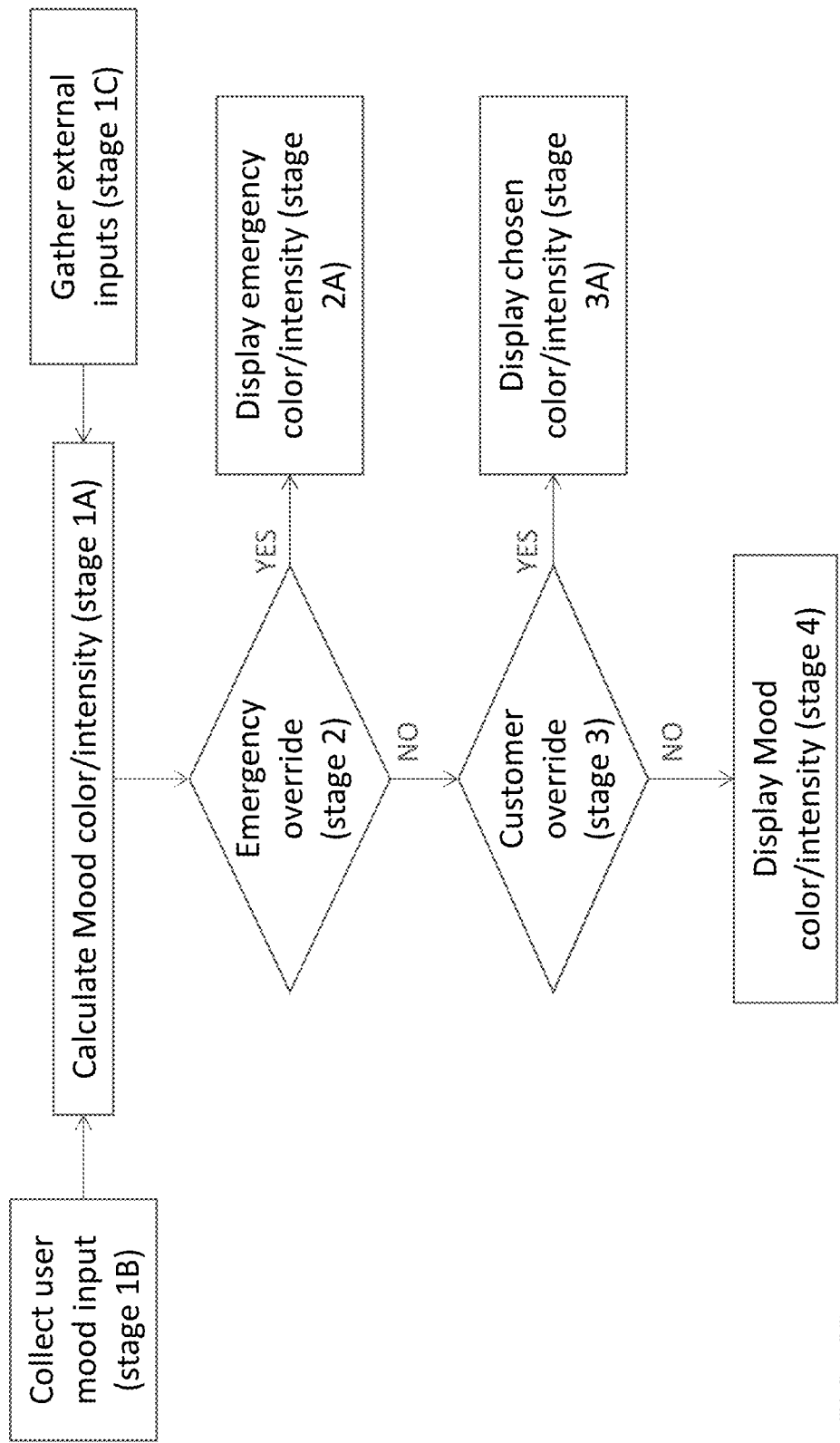
FIG. 6D is a flow diagram showing the operation of a system for operation and management of an urban color lighting network according to at least some embodiments of the present invention.

Reference is now made to FIG. 6D which is a flow diagram showing the operation of a system for operation and management of an urban color lighting network according to at least some embodiments of the present invention. As referred to below, lighting color may also include lighting intensity. As shown, in stage 1A the "urban mood" and related aura color that is related to network 600 or zones 602 is calculated by backend 210. The calculation is based on a range of "mood factors" as described above using the algorithm and choices as defined by beacon customer 222 or an aura customer 620. One potential non-limiting mood factor is collection of user mood input in stage 1B which may be via the dedicated app described above or via other means such as facial expression detection.

Optionally the mood calculation of stage 1A is based on gathering other mood factors such as provided in stage 1C. As above these may be based on campaigns, events or news. In stage 2 provision is made for an emergency override such as when an alert status exists. In such a case, in stage 3A, lighting network 600 displays the predefined alert or emergency color and/or intensity.

If no emergency situation exists then in stage 4A the customer such as customers 222 and/or 620 can override the mood color as desired for any purpose such as the non-limiting examples of announcements, advertising, entertainment, or testing. Another non-limiting example is the definition of an energy saving plan which optionally requires reduction of lighting intensity or turning off of lights due to energy conservation requirements. In stage 4A in case of an override, the chosen customer color/intensity is shown in all or parts of lighting network 600.

If no customer override is present, then in stage 5 the mood color and/or intensity determined in stage 2 is shown in all or parts/zones of lighting network 600.

Figure 7:
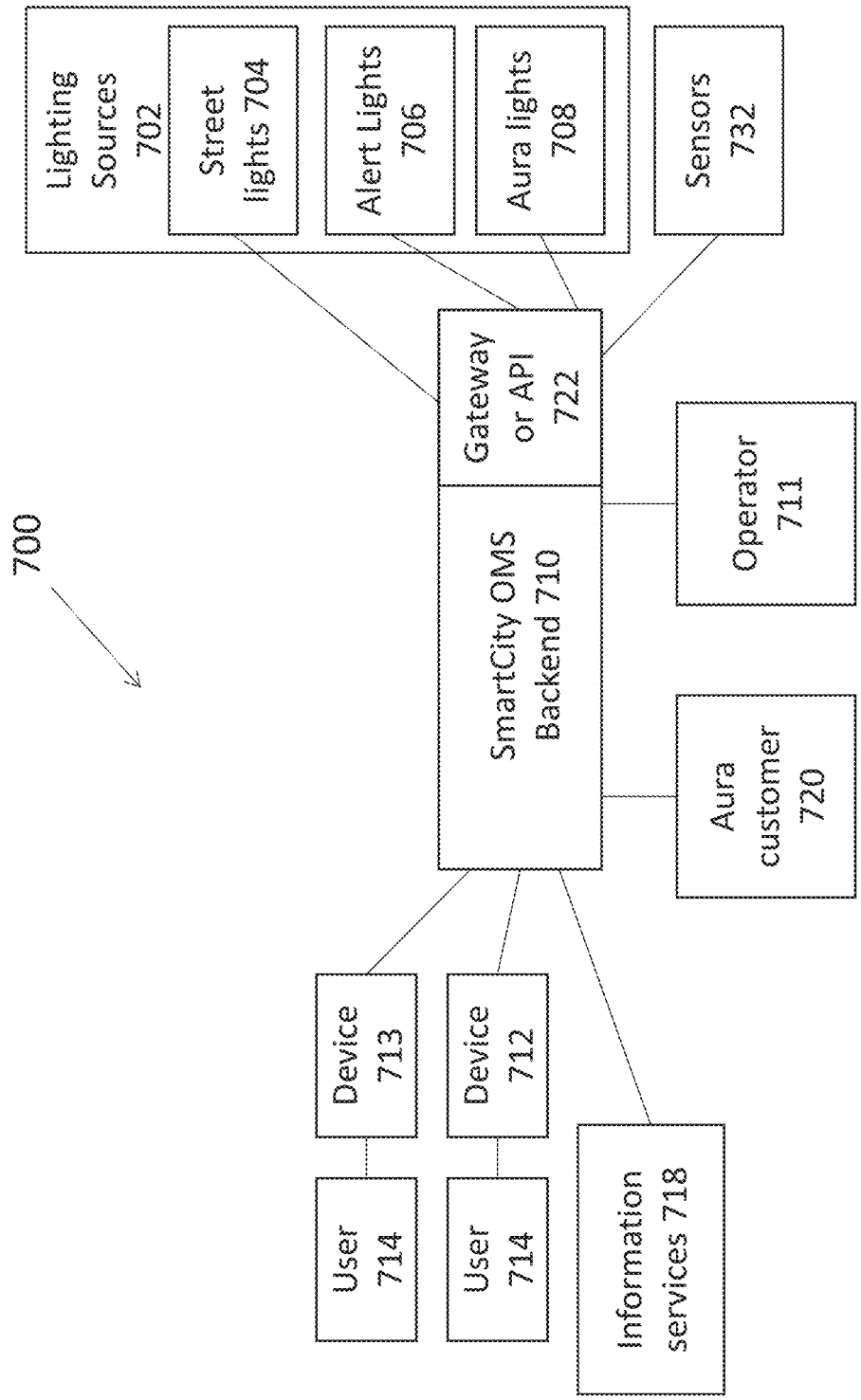
FIG. 7 is a schematic block diagram showing a system for operation and management of an urban color lighting network according to at least some embodiments of the present invention.

Reference is now made to FIG. 7 which is a schematic block diagram showing a system for operation and management of an urban color lighting network according to at least some embodiments of the present invention.

The lighting network of FIG. 7 operates in a similar fashion to that of FIG. 6A but does not include any beacons or related hardware. The embodiment of FIG. 7 thus includes all of the options and functionality of the network displayed in FIG. 6A aside from those requiring beacons 206. Thus lighting 702 comprises street lights 704, alert lights 706, and Aura lights 708, optionally grouped into zones (not shown).

For lighting sources 702, either existing or additional sensors 732 provide for detection of the lighting conditions around each light source. Sensors 632 can indicate to backend 710 whether it is light or dark in the area surrounding the light source 702 including any level of light in between such as dusk or overcast conditions. This information can in turn be used to set the lighting intensity of the light sources 702, for example to reduce or increase light intensity to match the lighting conditions surrounding the light sources 702. Optionally, an assessment of the lighting condition per zone can be made to adjust lighting per zone based on the feedback from the sensors 732. Sensors 732 can also include cameras for providing data about ambient brightness around each beacon as well as other factors that can be used such as presence of people, crowd level data or crowd mood such as via smile detection. Light intensity may preferably be adjusted to save electricity such as when sensors 732 determine that there are no people in the vicinity of the light source or zone.

Lighting is controlled by server-based backend 710. Backend 710 communicates with lighting sources 702 and may optionally use a gateway or API 722. Sensors 732 provide feedback to backend 210. Gateway 722 preferably supports lighting control standards as known in the art including but not limited to Digital Addressable Lighting Interface (DALI) including IEC 60929 and IEC 62386, 0-10 V, Digital Signal Interface (DSI), or any other current or future standard.

User mood is gathered from devices 712 and 713 which are respectively a device running a lighting mood app (such as in FIGS. 6B and 6C) and a device with a Web browser offering user choice of mood.

OMS backend 710 collects the inputs from users and computes the appropriate mood color based on any of the average or median of all the colors and/or moods chosen by users based on the input method chosen.

Optionally, backend 710 collects other information or inputs that are used to adjust the mood color. Cameras that are part of sensors 732 may detect facial expressions of users in the vicinity of lighting 702 and determine a mood of the area based on the recognized expressions. Optionally, crowd level data as detected by sensors 732 is used. Other information may be related to events taking place in the area where an event-related color would be used instead of the computed mood color. Alternatively, a news event might trigger a color not related to the calculated mood. Alternatively, an emergency event may trigger an override of the chosen color so that the lighting of network 700 is used to display an alert color. Data about events, news or alerts may optionally be provided by information services 718.

Other exemplary factors for calculating the city aura color could include public opinion about an issue, event or person, feedback or monitoring of social media, public or religious or commemorative days, or time of day, month, or year. Optionally, the aura color could be based on a campaign run by aura customer 720 to ask users choose a color based on a specific issue or event.

Preferably, the aura customer 720 chooses what algorithm to use and also the weighting of the various parameters and factors, such as those listed above, used in the algorithm including which inputs are used at any given time.

Alternatively the aura customer 720 chooses a color based on a specific need. Non-limiting examples may include an event in the urban area or a beacon or lighting zone associated with a specific color, or a choice of a color for a specific day, choice of color for advertising purposes or testing of the system. Using management portal (not shown) that is part of backend 710, customer 720 may access provisioning interface (not shown) to choose a lighting algorithm and/or color for any part or zone of lighting 702 including any combination of colors and intensities of light within the capabilities of the lighting 702.

Customer 720 may also use provisioning interface to change the colors associated with specific moods. Such a change will affect the color choices available to users 714 of devices 712 and 713. Preferably, some colors may be reserved for specific use. A non-limiting example might include reserving of red or amber as emergency colors only. Customer 720 may also access reporting interface (not shown) of backend 710 to view the status of lighting 702 and also feedback from sensors 732.

Customer 720 may also use provisioning interface to set energy saving characteristics of the lighting network 700. Non-limiting examples include defining times of day, optionally relative to sunrise and sunset, for increasing or decreasing lighting intensity, or reduced lighting intensity if no people are detected in the surroundings of the zone or lighting source 702.

Once the color to be displayed in parts or all of lighting network 700 are chosen, backend 710 instructs the hardware associated with lighting 702 to display the chosen light color and/or intensity. The flow for management and color choice of network 700 is as shown in FIG. 6D. Additionally the chosen color and optionally reasons for the chosen color are provided by backend 710 to a website, app, social media or other broadcast means (not shown) to communicate the color choice to the population surrounding lighting 702. Optionally, this reason/choice data is also provided on the app, or website accessed by users to choose the color.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

While the invention has been described with respect to a limited number of embodiments, it will be appreciated that many variations, modifications and other applications of the invention may be made.

What is claimed is:

1. A method for manipulating lighting in an urban lighting network comprising a plurality of lighting sources configured for illumination with a chosen color and intensity, the method comprising:

providing a backend connected to the plurality of lighting sources, wherein the backend runs on a server;

determining by the backend of an emergency illumination color and intensity based on an emergency condition;

determining by the backend of a mood illumination color and intensity based on mood factors; and instructing by the backend of the plurality of lighting sources to illuminate with the determined emergency or mood color and intensity or with a chosen override color and intensity, wherein an emergency color and intensity takes precedence over a chosen override color and intensity, and a chosen override color and intensity takes precedence over an urban color and intensity.

2. The method of claim 1 wherein the lighting sources are divided into lighting zones.

3. The method of claim 1 wherein the mood factors are selected from the list consisting of:
   a. user selected colors;
   b. mood detection;
   c. crowd levels;
   d. public opinion;
   e. monitoring of social media;
   f. weather conditions;
   g. a color choice campaign;
   h. a news event; and
   i. an event in the geographic area of the lighting network.

4. The method of claim 1 wherein the lighting source comprises a multifunctional beacon comprising a plurality of lighting sources.

5. The method of claim 1 wherein the lighting source comprises mobile lighting.

6. The method of claim 1 wherein the lighting sources are selected from the group comprising:
   a. street lighting;
   b. emergency lighting;
   c. aura lighting; and
   d. display panels.

7. The method of claim 1 wherein the lighting network further comprises a plurality of environmental sensors, and wherein the sensors provide information about lighting intensity in the environment of the network.

8. The method of claim 7, wherein the sensors comprise cameras and the cameras capture crowd level data and/or crowd mood data.

9. The method of claim 7 wherein the environmental sensors detect environmental conditions and wherein the determined color and intensity is based on the detected environmental conditions.

10. The method of claim 1 wherein the chosen override color and/or intensity is based on an energy saving plan.

11. An urban lighting network comprising:
    a. a plurality of lighting sources configured for illumination with a color and intensity; and
    b. a backend connected to the plurality of lighting sources, wherein the backend runs on a server,
    wherein the backend is configured for determining of an emergency illumination color and intensity based on an emergency condition, for determining of a mood illumination color and intensity based on mood factors, and for instructing the plurality of lighting sources to illuminate with the determined emergency or mood color and intensity or with a chosen override color and intensity, wherein an emergency color and intensity takes precedence over a chosen override color and intensity, and a chosen override color and intensity takes precedence over an urban color and intensity.

12. The lighting network of claim 11 wherein the lighting sources comprise a multifunctional beacon comprising a plurality of lighting sources.

13. The lighting network of claim 11 wherein the lighting sources comprises mobile lighting.

14. The lighting network of claim 11 wherein the lighting sources are divided into lighting zones.

15. The lighting network of claim 11 wherein the mood factors are selected from the list consisting of:
    a. user selected colors;
    b. mood detection;
    c. crowd levels;
    d. public opinion;
    e. monitoring of social media;
    f. weather conditions;
    g. a color choice campaign;
    h. a news event; and
    i. an event in the geographic area of the lighting network.

16. The lighting network of claim 11 wherein the lighting sources are selected from the group comprising:
    a. street lighting;
    b. emergency lighting;
    c. aura lighting; and
    d. display panels.

17. The lighting network of claim 11 further comprising a plurality of environmental sensors; wherein the sensors provide information about lighting intensity in the environment of the network.

18. The lighting network of claim 17 wherein the sensors comprise cameras and the cameras capture crowd level data and/or crowd mood data.

19. The lighting network of claim 17 wherein the environmental sensors detect environmental conditions and wherein the determined color and intensity is based on the detected environmental conditions.

20. The lighting network of claim 11 wherein the chosen override color and/or intensity is based on an energy saving plan.

* * * * *